US009934690B2

(12) United States Patent
Kuroda

(10) Patent No.: US 9,934,690 B2
(45) Date of Patent: Apr. 3, 2018

(54) OBJECT RECOGNITION APPARATUS AND VEHICLE TRAVEL CONTROLLER USING SAME

(71) Applicant: Hitachi Automotive Systems, Ltd., Hitachinaka-shi, Ibaraki (JP)

(72) Inventor: Hiroshi Kuroda, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/307,394

(22) PCT Filed: Jun. 3, 2015

(86) PCT No.: PCT/JP2015/065967
§ 371 (c)(1),
(2) Date: Oct. 28, 2016

(87) PCT Pub. No.: WO2015/194371
PCT Pub. Date: Dec. 23, 2015

(65) Prior Publication Data
US 2017/0053533 A1    Feb. 23, 2017

(30) Foreign Application Priority Data

Jun. 19, 2014 (JP) ................... 2014-126634

(51) Int. Cl.
*G08G 1/16*     (2006.01)
*B60Q 9/00*     (2006.01)
(Continued)

(52) U.S. Cl.
CPC .......... *G08G 1/167* (2013.01); *B62D 15/021* (2013.01); *G06K 9/00798* (2013.01);
(Continued)

(58) Field of Classification Search
CPC ........... G06T 7/20; B62D 15/025; B60R 1/00; G08G 1/163; G08G 1/16; B60W 50/0098;
(Continued)

(56) References Cited

U.S. PATENT DOCUMENTS 4,786,164 A * 11/1988 Kawata ................ G01S 13/931
                                                                                                180/168
6,388,565 B1    5/2002   Bernhard et al.
(Continued)

FOREIGN PATENT DOCUMENTS

JP       2001-10433 A     1/2001
JP       2001-357497 A   12/2001
(Continued)

OTHER PUBLICATIONS

International Search Report (PCT/ISA/210) issued in PCT Application No. PCT/JP2015/065967 dated Aug. 4, 2015 with English translation (5 pages).

(Continued)

*Primary Examiner* — Yuri Kan
(74) *Attorney, Agent, or Firm* — Crowell & Moring LLP

(57) ABSTRACT

The present invention provides an object recognition apparatus which, in a vehicle that detects an object present behind (including obliquely behind) the vehicle using a radio wave radar, is able to precisely recognize the position of the object present behind (including obliquely behind) the vehicle during traveling on a curve and a lane change, and a vehicle travel controller using the same. An object recognition apparatus is provided with: an image capturing unit which captures an image of an environment in front of a vehicle; a lane detection unit which detects a lane in front of the vehicle on the basis of the image captured by the image capturing unit; a lane position estimation unit which estimates the position of a lane behind the vehicle on the basis of the lane detected by the lane detection unit and the travel (Continued)

history of the vehicle; a rear object detection unit which detects an object present behind the vehicle; and a relative position calculation unit which calculates the relative position of the object detected by the rear object detection unit with respect to the position of the lane estimated by the lane position estimation unit.

11 Claims, 20 Drawing Sheets

(51) Int. Cl.
    *G01C 3/08*     (2006.01)
    *B62D 15/02*     (2006.01)
    *G06T 7/20*     (2017.01)
    *G06T 7/60*     (2017.01)
    *G06K 9/00*     (2006.01)
    *G01S 13/93*     (2006.01)

(52) U.S. Cl.
    CPC ............ *G06K 9/00805* (2013.01); *G06T 7/20* (2013.01); *G06T 7/60* (2013.01); *G01S 2013/9332* (2013.01)

(58) Field of Classification Search
    CPC ........ G01C 21/3658; G01C 3/08; G05D 1/00; G06F 7/00
    See application file for complete search history.

(56) References Cited

U.S. PATENT DOCUMENTS

| | | | |
|---|---|---|---|
| 2002/0087269 A1* | 7/2002 | Sasaki | ........................ B60R 1/00 701/301 |
| 2004/0193347 A1* | 9/2004 | Harumoto | ........... B60R 21/0132 701/45 |
| 2008/0055114 A1* | 3/2008 | Kim | .......................... B60R 1/00 340/937 |
| 2009/0157273 A1* | 6/2009 | Kim | .................. B60W 50/0098 701/70 |
| 2011/0130936 A1* | 6/2011 | Noda | ..................... G08G 1/163 701/70 |
| 2012/0277957 A1* | 11/2012 | Inoue | .................... B60W 30/12 701/41 |
| 2012/0296522 A1* | 11/2012 | Otuka | .................... G08G 1/167 701/41 |
| 2014/0188345 A1* | 7/2014 | Tamura | ................ B62D 15/025 701/42 |
| 2014/0244157 A1* | 8/2014 | Tan | .................... G01C 21/3658 701/423 |
| 2014/0343792 A1 | 11/2014 | Akiyama | |
| 2015/0029012 A1* | 1/2015 | Mitani | ................... B60Q 9/008 340/436 |

FOREIGN PATENT DOCUMENTS

| | | |
|---|---|---|
| JP | 2007-188349 A | 7/2007 |
| JP | 2010-127908 A | 6/2010 |
| WO | WO 2013/098996 A1 | 7/2013 |

OTHER PUBLICATIONS

Japanese-language Written Opinion (PCT/ISA/237) issued in PCT Application No. PCT/JP2015/065967 dated Aug. 4, 2015 (3 pages).

\* cited by examiner $$\begin{cases} Gn3 = (xg\_n3, yg\_n3, zg\_n3) \\ Gn2 = (xg\_n2, yg\_n2, zg\_n2) \\ Gn1 = (xg\_n1, yg\_n1, zg\_n1) \end{cases}$$

$$\begin{cases} Gn3 = (xg\_n3, yg\_n3, zg\_n3) \\ Gn2 = (xg\_n2, yg\_n2, zg\_n2) \\ Gn1 = (xg\_n1, yg\_n1, zg\_n1) \end{cases}$$

OBJECT RECOGNITION APPARATUS AND VEHICLE TRAVEL CONTROLLER USING SAME

TECHNICAL FIELD

The present invention relates to an object recognition apparatus and a vehicle travel controller using the same. Particularly, the invention relates to a vehicle travel controller that controls a travel state of an own vehicle by recognizing a position of an object existing at a rear side including an oblique rear side of the own vehicle.

BACKGROUND ART

Recently, there is known a technique disclosed in, for example, PTL 1 as a technique of detecting a position of an object existing behind an own vehicle.

An object position detection device disclosed in PTL 1 includes a storage unit which stores a travel position of an own vehicle traveling on a road, a detection unit which detects a position of a rear object existing behind the own vehicle, and an estimation unit which estimates a vehicle lane on which the rear object is located on the basis of a relative positional relation between the past travel position of the own vehicle stored in the storage unit and the position of the rear object detected by the detection unit, wherein the estimation unit estimates the vehicle lane on which the rear object is located on the basis of a distance between the position of the rear object and a travel track obtained from the past travel position of the own vehicle.

CITATION LIST

Patent Literature

PTL 1: JP 2010-127908 A

SUMMARY OF INVENTION

Technical Problem

Incidentally, there is a case where a driver of a vehicle traveling on a certain vehicle lane changes vehicle lanes, for example, when overtaking a preceding vehicle or turning left or right. Likewise, when the own vehicle changes the vehicle lanes, the travel position of the own vehicle moves across the vehicle lane.

In the object position detection device disclosed in PTL 1, the vehicle lane on which the rear object is located is estimated on the basis of the distance between the position of the rear object and the travel track obtained from the past travel position of the own vehicle. For this reason, as described above, when the own vehicle changes the vehicle lane and the past travel position of the own vehicle moves across the vehicle lane, the own vehicle cannot accurately recognize the vehicle lane on which the own vehicle travels or the vehicle lane on which the rear object is located as illustrated in FIG. 20. For example, there is a possibility that an erroneous warning sound may be generated for the driver who drives the own vehicle. Further, in the object position detection device disclosed in PTL 1, there is a case where the vehicle lane on which the own vehicle travels or the vehicle lane on which the rear object is located cannot be accurately recognized even when the own vehicle travels on a curved vehicle lane. Thus, as described above, for example, there is a possibility that an erroneous warning sound may be generated for the driver who drives the own vehicle.

Further, in the object position detection device disclosed in PTL 1, a millimeter wave radar is used as the detection unit that detects the position of the rear object existing behind the own vehicle. However, for example, when the own vehicle travels on a road provided with a guardrail, a signal output from a radio wave radar such as a millimeter wave radar is reflected by the guardrail. As a result, a problem arises in that the position of the rear object and the vehicle lane on which the rear object is located cannot be accurately estimated.

The invention is made in view of the above-described problems and an object of the invention is to provide an object recognition apparatus capable of accurately recognizing a position of an object existing at a rear side including an oblique rear side of an own vehicle and a vehicle travel controller using the same.

Solution to Problem

In order to solve the problems, an object recognition apparatus according to the present invention is an object recognition apparatus that recognizes a position of an object existing behind an own vehicle, including: an image sensing device that captures an image of an environment at the front or rear side of an own vehicle; a vehicle lane detection unit that detects a vehicle lane at the front or rear side of the own vehicle on the basis of the image captured by the image sensing device; a vehicle lane position estimation unit that estimates a position of a vehicle lane behind the own vehicle on the basis of the vehicle lane detected by the vehicle lane detection unit and a travel history of the own vehicle; a rear object detection unit that detects an object existing behind the own vehicle; and a relative position calculation unit that calculates a relative position of the object detected by the rear object detection unit with respect to the position of the vehicle lane estimated by the vehicle lane position estimation unit.

In addition, an object recognition apparatus according to the present invention is an object recognition apparatus that recognizes a position of an object existing behind an own vehicle, including: an image sensing device that captures an image of an environment at the front or rear side of an own vehicle; a solid object detection unit that detects a stationary object at the front or rear side of the own vehicle on the basis of the image captured by the image sensing device; a solid object position estimation unit that estimates a position of a stationary object behind the own vehicle on the basis of the stationary object detected by the solid object detection unit and a travel history of the own vehicle; a rear object detection unit that detects an object existing behind the own vehicle; and a relative position calculation unit that calculates a relative position of the object detected by the rear object detection unit with respect to the position of the stationary object estimated by the solid object position estimation unit.

In addition, a vehicle travel controller according to the present invention is a vehicle travel controller that controls a travel state of an own vehicle on the basis of a position of an object recognized by the object recognition apparatus.

Advantageous Effects of Invention

According to the invention, the vehicle lane or the stationary object in front of the own vehicle is detected on the basis of an image captured by the image sensing device capturing an image of an environment in front of the own vehicle, the position of the vehicle lane or the stationary object behind the own vehicle is estimated on the basis of the detected vehicle lane or stationary object and the travel history of the own vehicle, and the relative position of the object existing behind the own vehicle with respect to the estimated position of the vehicle lane or the stationary object is calculated. Accordingly, it is possible to accurately recognize the position of the object existing at the rear side including the oblique rear side of the own vehicle.

The above-described objects, configurations, and advantages are proved by the description of the embodiments below.

DESCRIPTION OF EMBODIMENTS

Hereinafter, embodiments of the invention will be described with reference to the drawings.

<First Embodiment>

Figure 1:
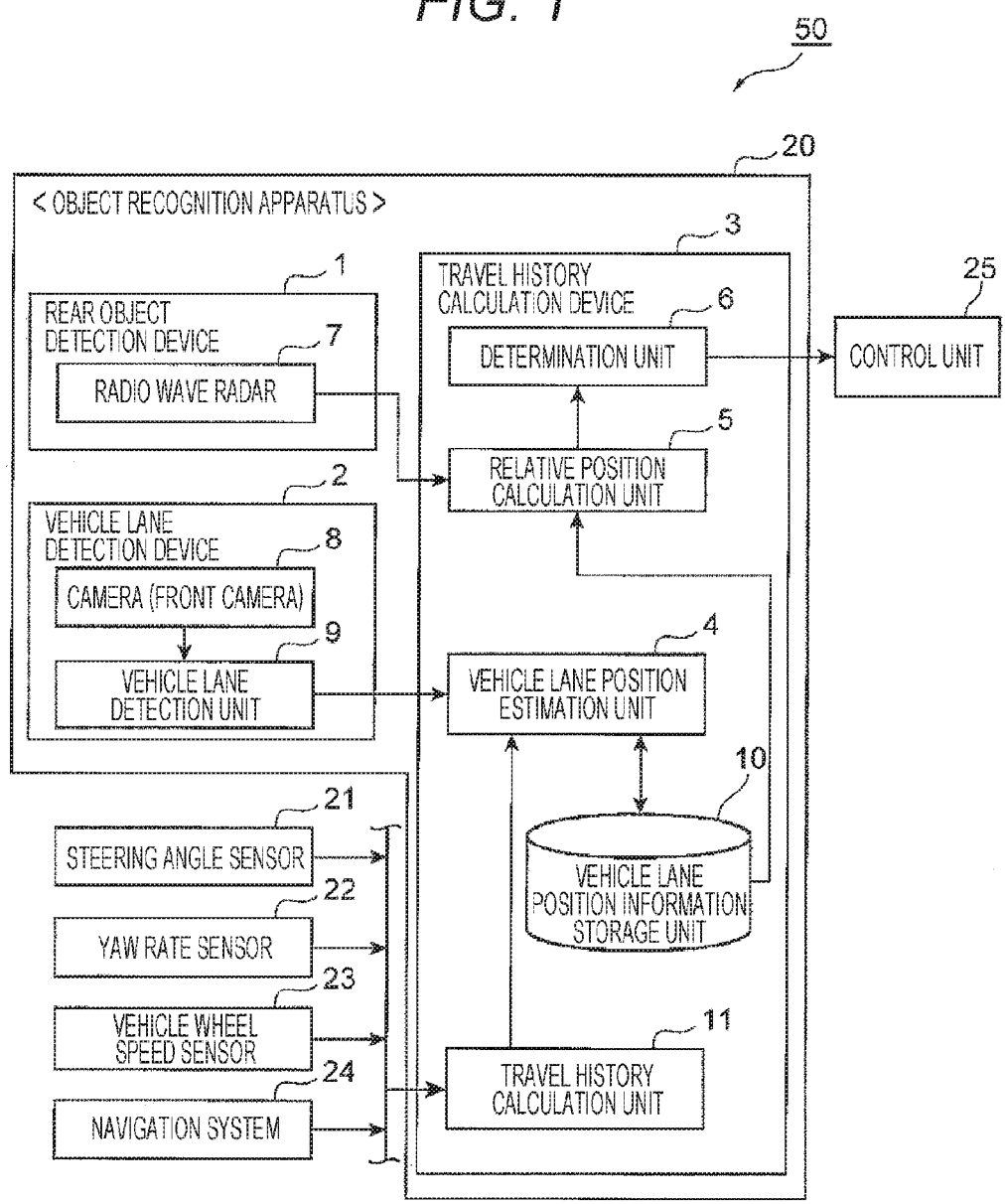
FIG. 1 is a configuration diagram illustrating a configuration of a first embodiment of a vehicle travel controller using an object recognition apparatus according to the invention.

FIG. 1 is a configuration diagram illustrating a configuration of a first embodiment of a vehicle travel controller using an object recognition apparatus according to the invention.

As illustrated in the drawing, a vehicle travel controller 50 mainly includes an object recognition apparatus 20 which recognizes a position of an object existing behind an own vehicle, a steering angle sensor 21, a yaw rate sensor 22, a vehicle wheel speed sensor 23, a navigation system 24, and a control unit 25 which generates various control signals for controlling a travel state and the like of an own vehicle on the basis of a position of an object recognized by the object recognition apparatus 20.

Further, the object recognition apparatus 20 includes a rear object detection device 1, a vehicle lane detection device 2, and a travel history calculation device 3.

The rear object detection device 1 is used to detect an object (for example, a moving or stopped/parked vehicle (an automobile, a motorcycle, a bicycle, or the like) or a people) existing at an oblique rear side (hereinafter, referred to as a rear side) of the own vehicle and includes, for example, a plurality of radio wave radars (rear object detection units) 7 provided behind the left and right sides of the own vehicle. The radio wave radars 7 are able to detect a relative position (a distance and a direction) and a relative speed of an object behind the own vehicle with respect to the own vehicle by transmitting radio waves to a predetermined range behind the own vehicle and receiving reflected waves from the object existing in the range.

Figure 3:
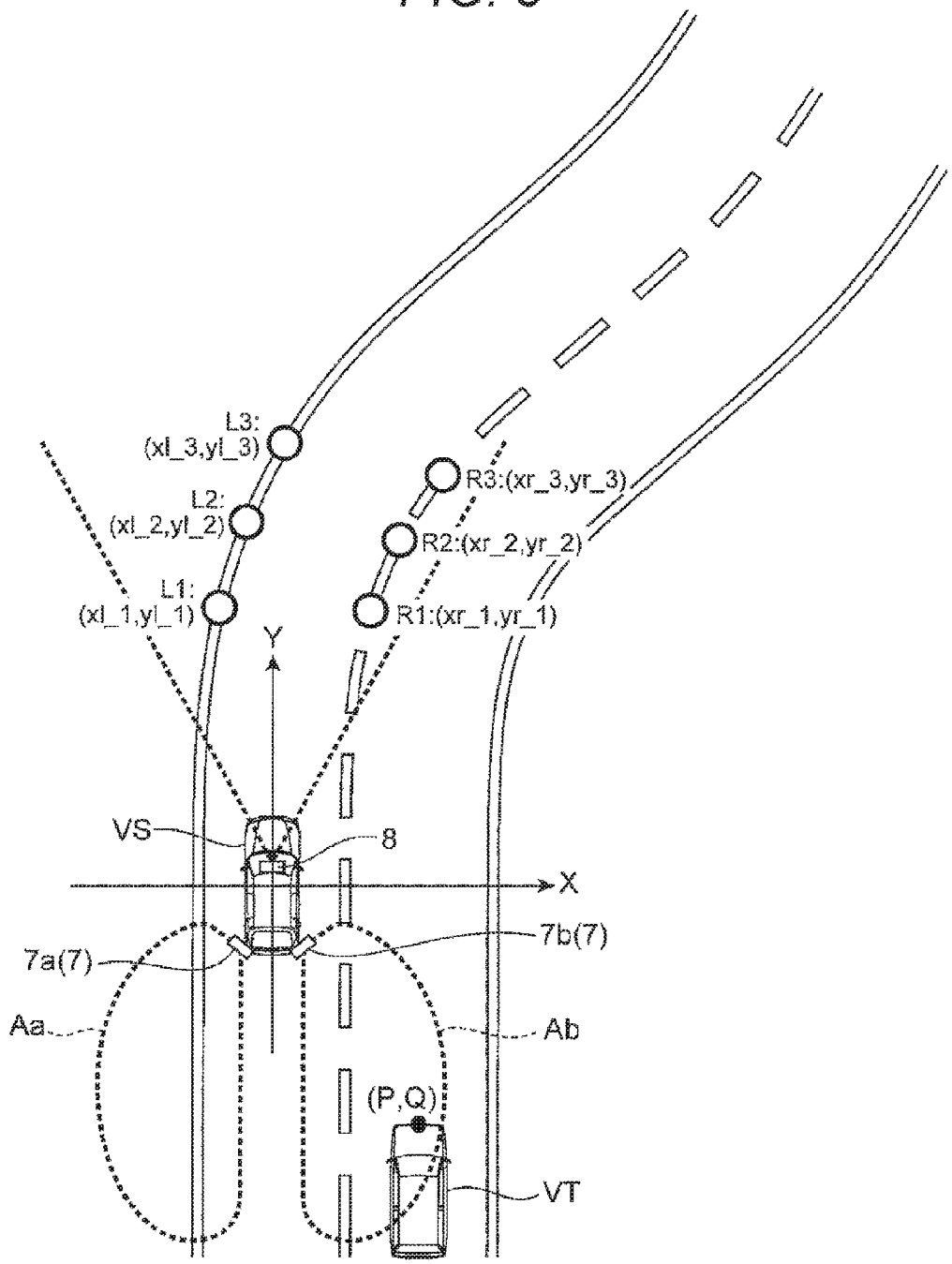
FIG. 3 is a diagram illustrating an example of a position of a rear vehicle and a vehicle lane with respect to an own vehicle.

Specifically, for example, as illustrated in FIG. 3, radio wave radars 7a and 7b are mounted behind left and right sides of an own vehicle VS. Here, the radio wave radar 7a which is provided behind the left side of the own vehicle VS sets an area Aa behind the left side of the own vehicle VS as a detection area and the radio wave radar 7b which is provided behind the right side of the own vehicle VS sets an area Ab behind the right side of the own vehicle VS as a detection area. For example, when a target vehicle VT exist on a vehicle lane adjacent to the right side of the own vehicle VS, the radio wave radar 7 detects a relative speed and a position (P, Q) of the target vehicle VT with respect to the own vehicle VS in a coordinate system X-Y using a center of the own vehicle VS as an original point by the use of the radio wave radars 7a and 7b.

The vehicle lane detection device 2 is used to detect a vehicle lane (a vehicle travel lane) in front of the own vehicle and includes, for example, a camera (a front camera) (an image sensing device) 8 which is disposed at an upper portion of a center of a wind shield of the own vehicle and captures an environment in front of the own vehicle and a vehicle lane detection unit 9 which detects a vehicle lane in front of the own vehicle on the basis of an image captured by the camera 8.

Figure 2:
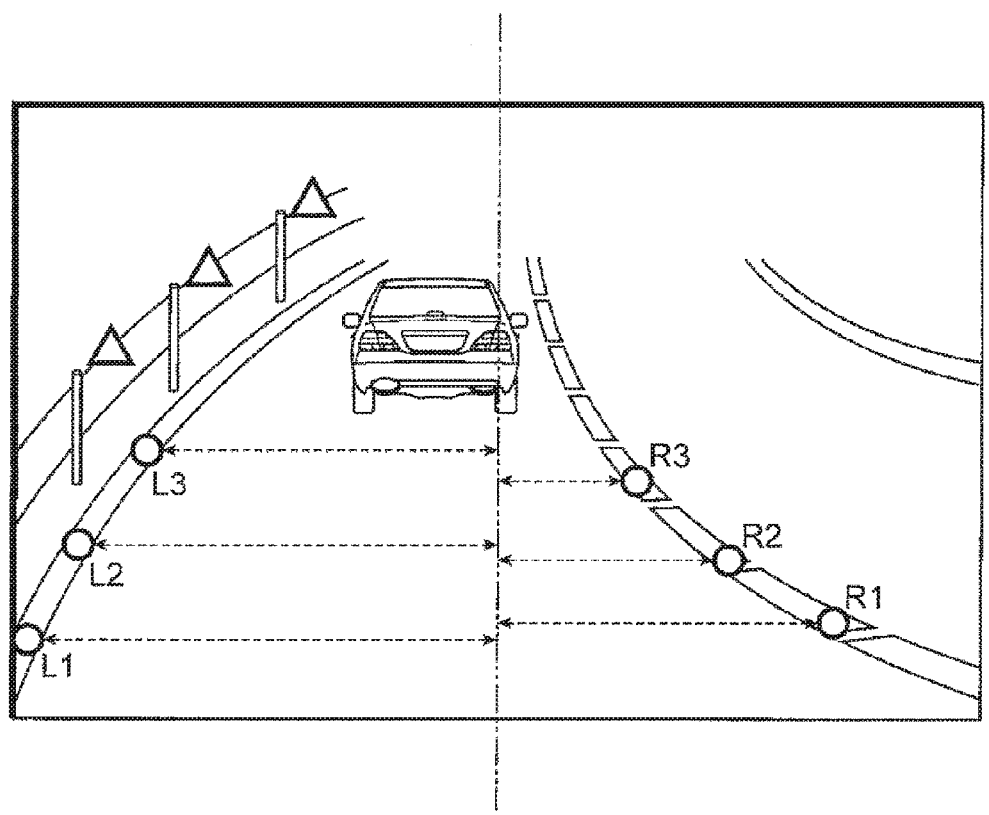
FIG. 2 is a diagram illustrating an example of an image captured by a camera illustrated in FIG. 1.

The camera 8 is configured as, for example, a CMOS camera and is attached to the own vehicle to have an optical axis directed obliquely downward at the front side of the own vehicle. Then, as illustrated in FIG. 2, the camera 8 captures an image of a peripheral environment including a road in the range of several tens of meters in front of the own vehicle and transmits the captured image to the vehicle lane detection unit 9.

The vehicle lane detection unit 9 performs, for example, a binarization process or a feature point extraction process based on the image captured by the camera 8 to select a pixel (a road dividing line candidate point) which is considered as a road dividing line (including a white line, a yellow line, a broken line, or bott's-dots) on a road from the image, recognizes continuously arranged road dividing line candidate points as a road dividing line constituting the vehicle lane to obtain the position, and transmits information on the position to the vehicle lane position estimation unit 4 of the travel history calculation device 3. In the image captured by the camera 8 illustrated in FIG. 2, the right road dividing lines are indicated by R1 to R3 and the left road dividing lines are indicated by L1 to L3 in a direction from the front side. In FIG. 3, the positions of the road dividing lines illustrated in FIG. 2 in the coordinate system X-Y using the center of the own vehicle as an original point are respectively indicated by R1: (xr_1, yr_1), R2: (xr_2, yr_2), R3: (xr_3, yr_3), L1: (xl_1, yl_1), L2: (xl_2, yl_2), and L3: (xl_3, yl_3). Additionally, in FIGS. 2 and 3, an example is illustrated in which the positions of the road dividing lines are respectively indicated as three points at the left and right sides, but the same applies to a case where two points or less or four points or more are obtained or a case where the positions are approximated to a line or a curve.

Further, various methods have been developed to recognize the road dividing line or the vehicle lane defined by the road dividing line. For example, a method of extracting a road shoulder or a median strip by a pattern matching can be also used. Further, the vehicle lane detection device 2 can be, of course, commonly used together with various vehicle lane detection devices used in, for example, a vehicle lane keep assist device (also referred to as a lane keep assist) or a vehicle lane departure warning device (also referred to as a lane departure warning).

The travel history calculation device 3 is used to calculate a position of an object existing behind the own vehicle on the basis of the information transmitted from the rear object detection device 1 or the vehicle lane detection device 2 and to output information necessary for the travel control of the own vehicle to the control unit 25 and mainly includes a travel history calculation unit 11, the vehicle lane position estimation unit 4, a vehicle lane position information storage unit 10, a relative position calculation unit 5, and a determination unit 6.

The travel history calculation unit 11 calculates a travel history of the own vehicle on the basis of information obtained by the steering angle sensor 21, the yaw rate sensor 22, the vehicle wheel speed sensor 23 serving as a vehicle speed sensor, and the navigation system 24 constituting the vehicle travel controller 50 and transmits the calculation result to the vehicle lane position estimation unit 4.

Figure 4:
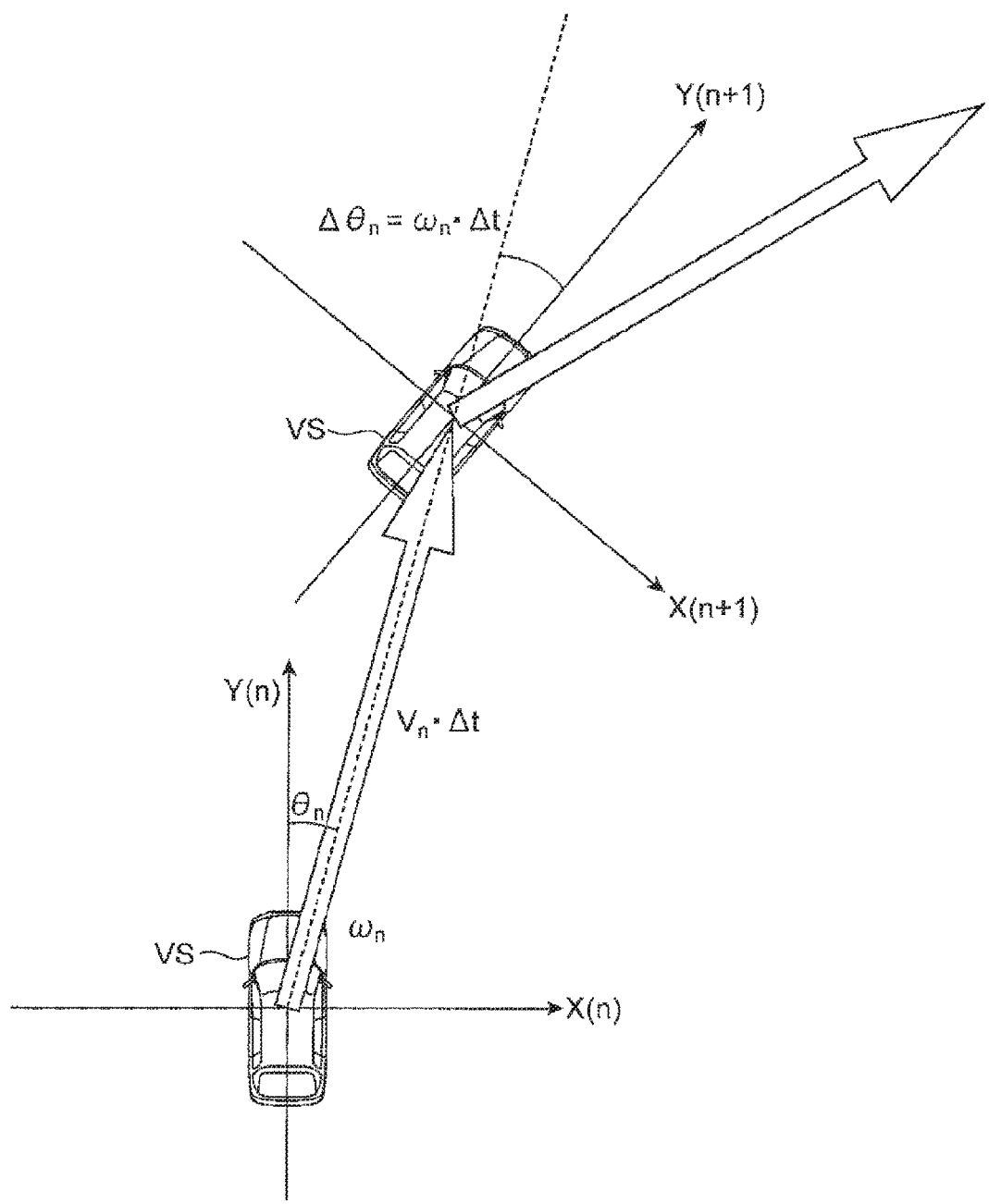
FIG. 4 is a diagram illustrating a change in time of a coordinate system using an own vehicle as an original point.

Specifically, as illustrated in FIG. 4, on the assumption that the coordinate system using the center of the own vehicle as an original point at the time t(n) is indicated by X(n)-Y(n), the coordinate system using the center of the own vehicle as an original point at the time t(n+1) is indicated by X(n+1)-Y(n+1), the speed of the own vehicle VS at the time t(n) is indicated by $V_n$, and the traveling direction is indicated by $\theta_n$, a positional change amount ($\Delta x$, $\Delta y$) of the own vehicle VS for $\Delta t = (t(n+1) - t(n))$ is expressed by Equation (1) below.

[Equation 1]

$$\begin{bmatrix} \Delta x \\ \Delta y \end{bmatrix} = \begin{bmatrix} \cos(\theta_n) \\ \sin(\theta_n) \end{bmatrix} * V_n^* \Delta t \qquad (1)$$

Next, a direction of the own vehicle VS at the time $t(n+1)=t(n)+\Delta t$ will be considered. When the rotation angular velocity of the own vehicle VS at the time t(n) to be estimated by the steering angle sensor 21 or the yaw rate sensor 22 is indicated by $\omega_n$, the traveling direction $\theta_{n+1}$ of the own vehicle VS at the time t(n+1) is estimated by Equation (2).

[Equation 2]

$$\theta_{n+1} = \theta_n + \omega_n \cdot \Delta t \qquad (2)$$

Further, an angle $\Delta \theta_n$ formed by the coordinate system X(n)-Y(n) using the center of the own vehicle as an original point at the time t(n) and the coordinate system X(n+1)-Y(n+1) using the center of the own vehicle as an original point at the time t(n+1) is expressed by Equation (3) below.

[Equation 3]

$$\Delta \theta_n = \omega_n \cdot \Delta t \qquad (3)$$

Here, the speed $V_n$ of the own vehicle VS in time is obtained by the vehicle wheel speed sensor 23, the navigation system 24, or the like and the traveling direction $\theta_n$ or the rotation angular velocity $\omega_n$ of the own vehicle VS is obtained by the steering angle sensor 21, the yaw rate sensor 22, the navigation system 24, or the like.

The vehicle lane position estimation unit 4 converts the vehicle lane position information (corresponding to the road dividing line position) output from the vehicle lane detection device 2 into the coordinate system using the center of the own vehicle as an original point in time on the basis of the above-described relational equation of the travel history calculation unit 11 and stores the conversion result in the vehicle lane position information storage unit 10. As for the conversion of the coordinate system at that time, a case will be considered in which a point P fixed to a ground surface is converted from the coordinate system X(n)-Y(n) using the center of the own vehicle as an original point at the time t(n) to the coordinate system X(n+1)-Y(n+1) at the time t(n+1). When the coordinate of the point P in the coordinate system at the time t(n) is indicated by (x(t(n)), y(t(n))) and the coordinate of the point P at the time t(n+1) is indicated by (x(t(n+1)), y(t(n+1))), a relation of the coordinate is expressed by Equation (4) below.

[Equation 4]

$$\begin{bmatrix} x(t(n+1)) \\ y(t(n+1)) \end{bmatrix} = \begin{bmatrix} \cos(\Delta \theta_n) & -\sin(\Delta \theta_n) \\ \sin(\Delta \theta_n) & \cos(\Delta \theta_n) \end{bmatrix} \times \left( \begin{bmatrix} x(t(n)) \\ y(t(n)) \end{bmatrix} - \begin{bmatrix} \Delta x \\ \Delta y \end{bmatrix} \right) \qquad (4)$$

$$= R(\Delta \theta_n) \times \begin{bmatrix} x(t(n)) - \Delta x \\ y(t(n)) - \Delta y \end{bmatrix}$$

In this way, the vehicle lane position estimation unit 4 converts the vehicle lane position detected in the past as the coordinate system using the center of the own vehicle as an original point in time on the basis of the information detected from the travel history calculation unit 11 and stores the conversion result in the vehicle lane position information storage unit 10. At the same time, the vehicle lane position estimation unit 4 acquires the vehicle lane position information at a current time point from the vehicle lane detection device 2 and additionally stores the vehicle lane position information in the vehicle lane position information storage unit 10.

Figure 5:
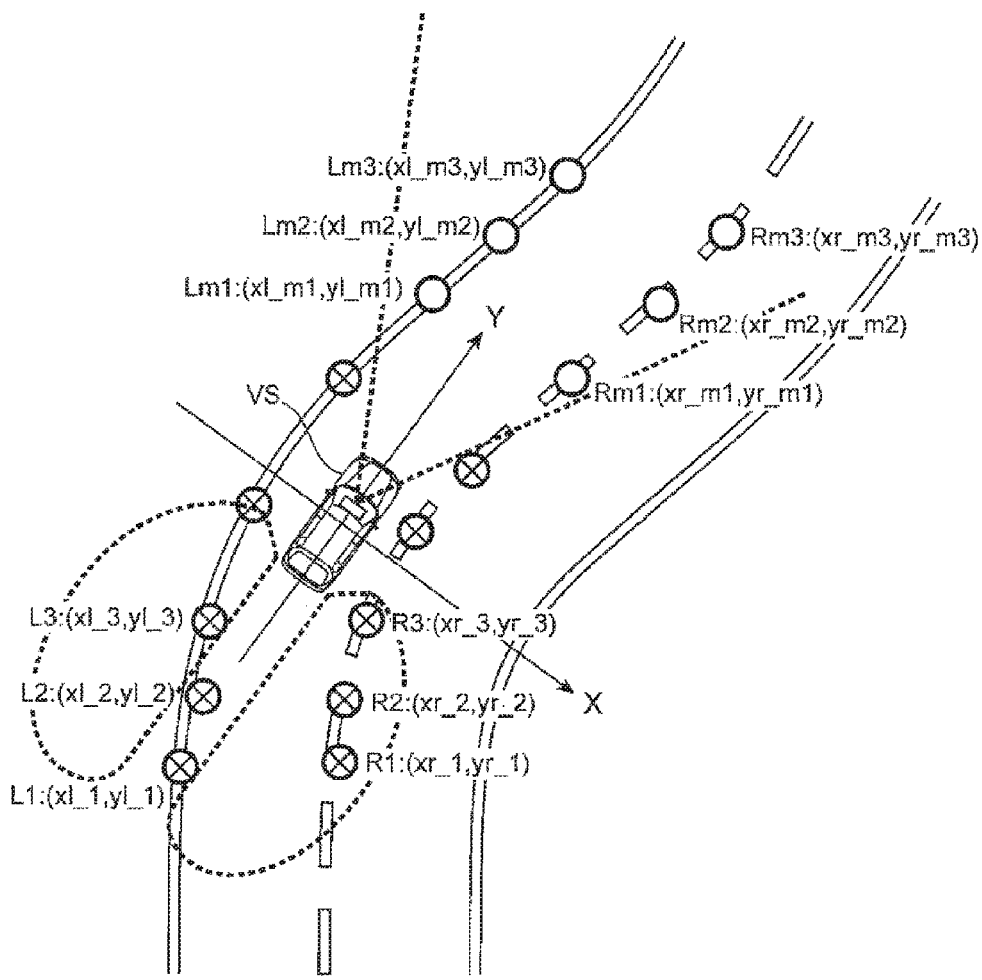
FIG. 5 is a diagram illustrating an example of vehicle lane position information stored in a vehicle lane position information storage unit illustrated in FIG. 1.

Specifically, as illustrated in FIG. 5, the vehicle lane position estimation unit 4 first stores the vehicle lane position information output from the vehicle lane detection device 2 at the time t(n) in the vehicle lane position information storage unit 10. For example, as illustrated in FIGS. 2 and 3, the coordinate information (xr_1(t(n)), yr_1(t(n))), (xr_2(t(n)), yr_2(t(n))), (xr_3(t(n)), yr_3(t(n))) is stored while a position (that is, vehicle lane information) of a right road dividing line obtained from an image captured by the camera 8 is set as positions R1 to R3 in the coordinate system X-Y using the center of the own vehicle as an original point at the time t(n). Similarly, although there is no description in FIG. 5, the coordinate information (xl_1(t(n)), yl_1(t(n))), (xl_2(t(n)), yl_2(t(n))), (xl_3(t(n)), yl_3(t(n))) is stored while a position (that is, vehicle lane information) of a left road dividing line obtained from an image captured by the camera 8 is set as positions L1 to L3 in the coordinate system X-Y using the center of the own vehicle as an original point.

Next, when the time elapses from t(n) to t(n+1), the vehicle lane position estimation unit 4 converts the positions R1 to R3 of the right road dividing line and the positions L1 to L3 of the left road dividing line into position information in the coordinate system X(n+1)-Y(n+1) using the center of the own vehicle as an original point at the time t(n+1) by Equation (4) and stores the conversion result in the vehicle lane position information storage unit 10.

In accordance with a series of conversion, coordinate information from the positions R1 to R3 of the right road dividing line detected at the time t(n) to positions Rm1 to Rm3 of the right road dividing line detected at the time t(n+m) is totally stored as the vehicle lane position information in the vehicle lane position information storage unit 10 at the time t(n+m) (see FIG. 5). Similarly, even in the left road dividing line, the position information of the road dividing line detected by the vehicle lane detection device 2 from the time t(n) to the time t(n+m) is stored as the vehicle lane position information in the vehicle lane position information storage unit 10.

In addition, the vehicle lane position information storage unit 10 stores the vehicle lane position information altogether from the past. However, it is practical to sequentially delete the vehicle lane position information stored for a predetermined time or more or the vehicle lane position information in which a distance from the own vehicle becomes a predetermined value or more from the vehicle lane position information storage unit 10 in order to prevent the overflow of the storage capacity.

In this way, when the vehicle lane position information is recognized in time and the past vehicle lane position information is used, the vehicle lane position behind the own vehicle can be accurately estimated.

The relative position calculation unit 5 is used to calculate a relative position of an object detected by the rear object detection device 1 at the position of the vehicle lane behind the own vehicle stored in the vehicle lane position information storage unit 10.

Figure 6:
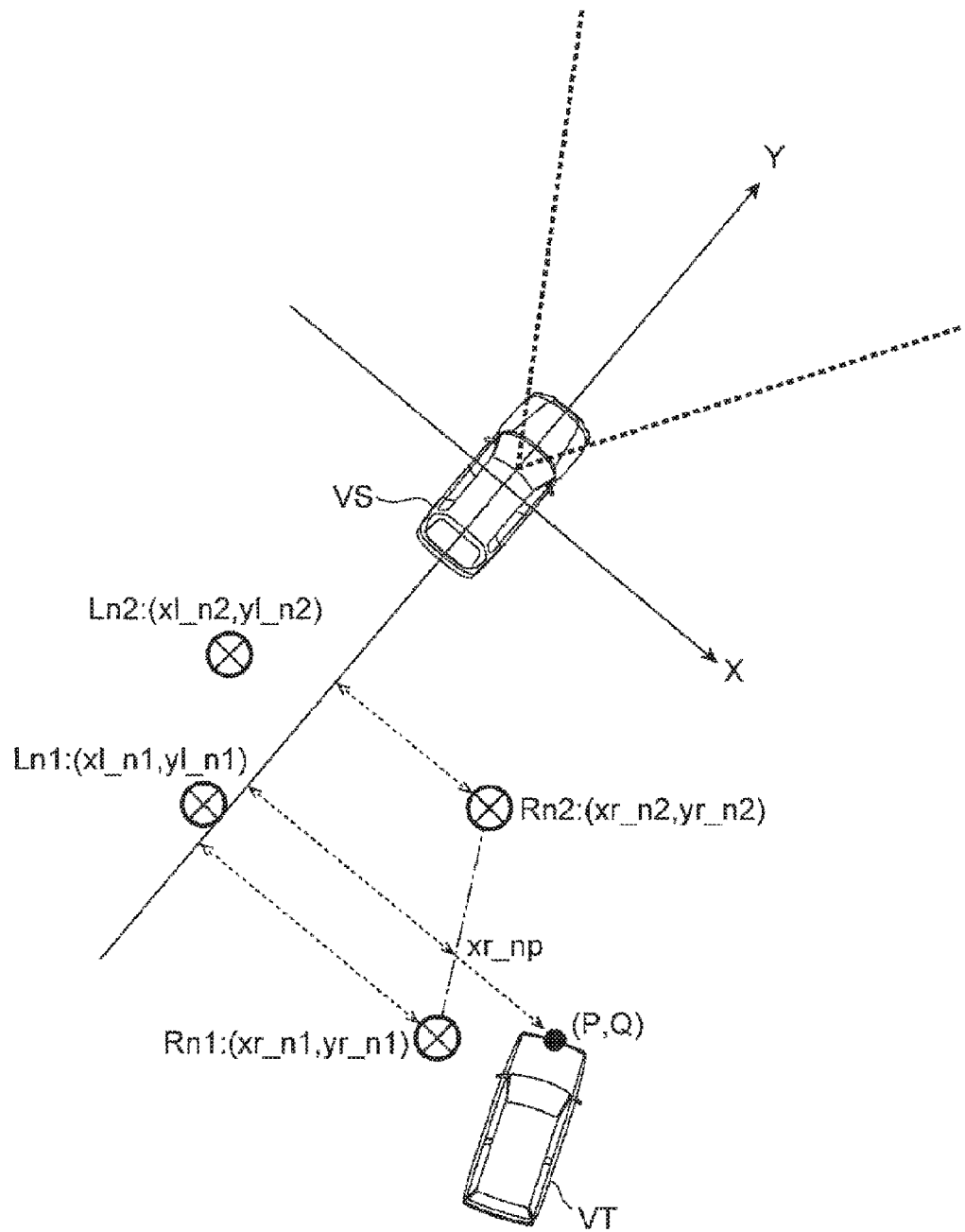
FIG. 6 is a diagram illustrating an example of a positional relation between a rear vehicle and a vehicle lane with respect to an own vehicle.
Figure 7:
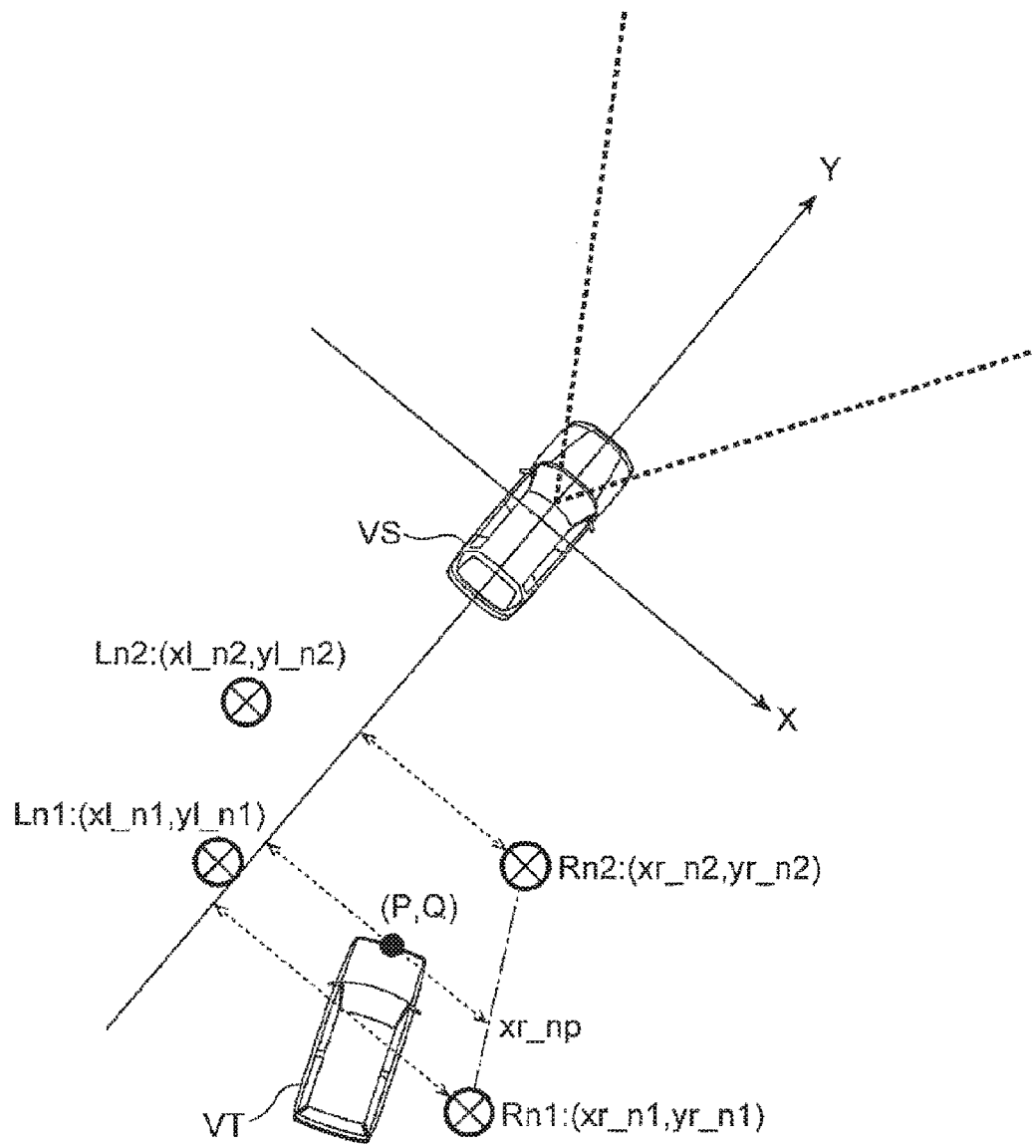
FIG. 7 is a diagram illustrating another example of a positional relation between a rear vehicle and a vehicle lane with respect to an own vehicle.

Specifically, when the rear object detection device 1 detects the target vehicle VT and the relative speed and the position (P, Q) of the target vehicle VT with respect to the own vehicle VS in the coordinate system X-Y using the center of the own vehicle as an original point as illustrated in FIG. 6 or 7, the relative position calculation unit 5 calculates two points (two points of each of the left and right road dividing lines) closest to each other in the traveling direction (the Y-axis direction) of the own vehicle VS from the vehicle lane position information stored in the vehicle lane position information storage unit 10. In the vehicle lane position information illustrated in FIG. 6 or 7, positions Rn1 and Rn2 of the right road dividing line are closest to each other in the Y-axis direction and positions Ln1 and Ln2 of the left road dividing line are closest to each other in the Y-axis direction. Then, the relative position calculation unit 5 obtains a line connecting two points Rn1 and Rn2 of the right road dividing line position, obtains an X-direction distance xr_np at a place corresponding to the position of the line in the Y-axis direction of the target vehicle VT, calculates a large/small relation between a value of the distance xr_np and a value P of the target vehicle VT in the X-axis direction, and transmits the calculation result to the determination unit 6.

The determination unit 6 determines whether an object detected by the rear object detection device 1 exists on a predetermined vehicle lane (for example, a vehicle lane which needs to generate a warning) on the basis of the large/small relation transmitted from the relative position calculation unit 5.

Specifically, the determination unit 6 determines whether the target vehicle VT exists at the inside or the outside of the right road dividing line on the basis of the large/small relation transmitted from the relative position calculation unit 5, for example, as illustrated in FIG. 6 and transmits the determination result to the control unit 25. Further, FIG. 6 illustrates an example in which the value P in the X-axis direction of the target vehicle VT is larger than the distance xr_np to the right road dividing line, that is, the target vehicle VT exists on the right adjacent vehicle lane. By the above-described calculation, it is possible to determine whether the target vehicle VT exists at the right adjacent vehicle lane with respect to the vehicle lane on which the own vehicle VS travels.

Meanwhile, FIG. 7 illustrates an example in which the value P in the X-axis direction of the target vehicle VT is smaller than the distance xr_np to the right road dividing line. In this case, the above-described calculation is also continuously performed on the left road dividing line. Accordingly, it is possible to determine whether the target vehicle VT exists at the rear side within the vehicle lane which is similar to the vehicle lane on which the own vehicle VS travels.

The control unit 25 generates various control signals for controlling the travel state and the like of the own vehicle on the basis of the information transmitted from (the determination unit 6 of the travel history calculation device 3 of) the object recognition apparatus 20.

Specifically, when the determination unit 6 determines that the object detected by the rear object detection device 1 exists on a predetermined vehicle lane (for example, a vehicle lane which generates a warning), the control unit 25 generates, for example, a control signal for controlling (regulating) a steering operation, a control signal for controlling a vehicle speed of the own vehicle, or a control signal for generating a warning (a warning sound or a warning display on a control panel) for a driver and transmits such a control signal to an appropriate in-vehicle device.

A flow of a series of processes which is performed by the above-described vehicle travel controller 50 will be described with reference to FIG. 8. First, in step S101, a vehicle lane position in the above-described coordinate system X-Y using the own vehicle as an original point is obtained by the vehicle lane detection device 2 of the object recognition apparatus 20 according to the method described with reference to FIGS. 2 and 3.

Next, in step S102, the vehicle lane position obtained in step S101 is stored in the vehicle lane position information storage unit 10 as the coordinate system using the own vehicle as an original point by the vehicle lane position estimation unit 4 of the travel history calculation device 3.

Next, in step S103, the movement amount of the own vehicle is estimated by the travel history calculation unit 11 for Δt seconds on the basis of the information obtained by the steering angle sensor 21, the yaw rate sensor 22, the vehicle wheel speed sensor 23, and the navigation system 24 constituting the vehicle travel controller 50 and the coordinate system X(n)-Y(n) using the own vehicle as an original point at the time t(n) and the coordinate system X(n+1)-Y(n+1) using the own vehicle as an original point at the time t(n+1) are obtained by Equation (1) to Equation (3).

Next, in step S104, the vehicle lane position information detected in the past by the vehicle lane detection device 2 is converted to the coordinate system using the own vehicle as an original point at a current time on the basis of Equation (4) to estimate the vehicle lane position behind the own vehicle by the vehicle lane position estimation unit 4 and the conversion result is stored in the vehicle lane position information storage unit 10.

Next, in step S105, a rear object (a target vehicle or the like) including a rear side is detected by the rear object detection device 1 and a position coordinate (P, Q) of the target vehicle is obtained.

Next, in step S106, a relative position between the vehicle lane position information stored in step S104 and the target vehicle detected in step S105 is obtained by the relative position calculation unit 5. More specifically, when the rear object detection device 1 detects the target vehicle and the position (P, Q) of the target vehicle in the coordinate system X-Y using the own vehicle as an original point as described above, the vehicle lane position information for two points closest to each other in the traveling direction (the Y-axis direction) of the own vehicle is selected from the vehicle lane position information stored in the vehicle lane position information storage unit 10. When the X-direction distance of the target vehicle with respect to the vehicle lane positions of two points closest to each other in the Y-axis direction is obtained, the relative position of the target vehicle with respect to the vehicle lane can be estimated.

Next, in step S107, the determination unit 6 determines a certain vehicle lane (a vehicle lane on which the own vehicle travels, a right adjacent vehicle lane, a left adjacent vehicle lane, or two or more separated vehicle lanes) on which the target vehicle behind the own vehicle travels on the basis of the information of the relative position of the target vehicle with respect to the vehicle lane obtained in step S106. Specifically, it is determined whether the target vehicle exists in an area (a vehicle lane) corresponding to a warning object. When it is determined that the target vehicle exists in the area (the vehicle lane) corresponding to the warning object, it is determined whether to actually output a warning sound from the information including the position and the speed (for example, information on whether the target vehicle approaches the own vehicle) of the target vehicle in step S108.

Then, when it is determined that a warning sound needs to be actually output in step S108, a control signal is generated by the control unit 25 to output a warning sound in step S109.

In addition, a series of these processes are repeated whenever Δт seconds elapse.

In this way, according to the first embodiment, in the vehicle that detects an object existing at the rear side including the oblique rear side of the own vehicle by the radio wave radar 7 such as a millimeter wave radar, the vehicle lane in front of the own vehicle is detected on the basis of the image captured by the camera 8 capturing an image of an environment in front of the own vehicle, the position of the vehicle lane behind the own vehicle is estimated on the basis of the detected vehicle lane and the travel history of the own vehicle, and the relative position of the object existing behind the own vehicle with respect to the estimated position of the vehicle lane is calculated. Accordingly, it is possible to accurately recognize the position of the object existing at the rear side including the oblique rear side of the own vehicle, that is, the vehicle lane on which the object is located even when the own vehicle travels on a curve or the vehicle lane is changed.

<Second Embodiment>

Figure 9:
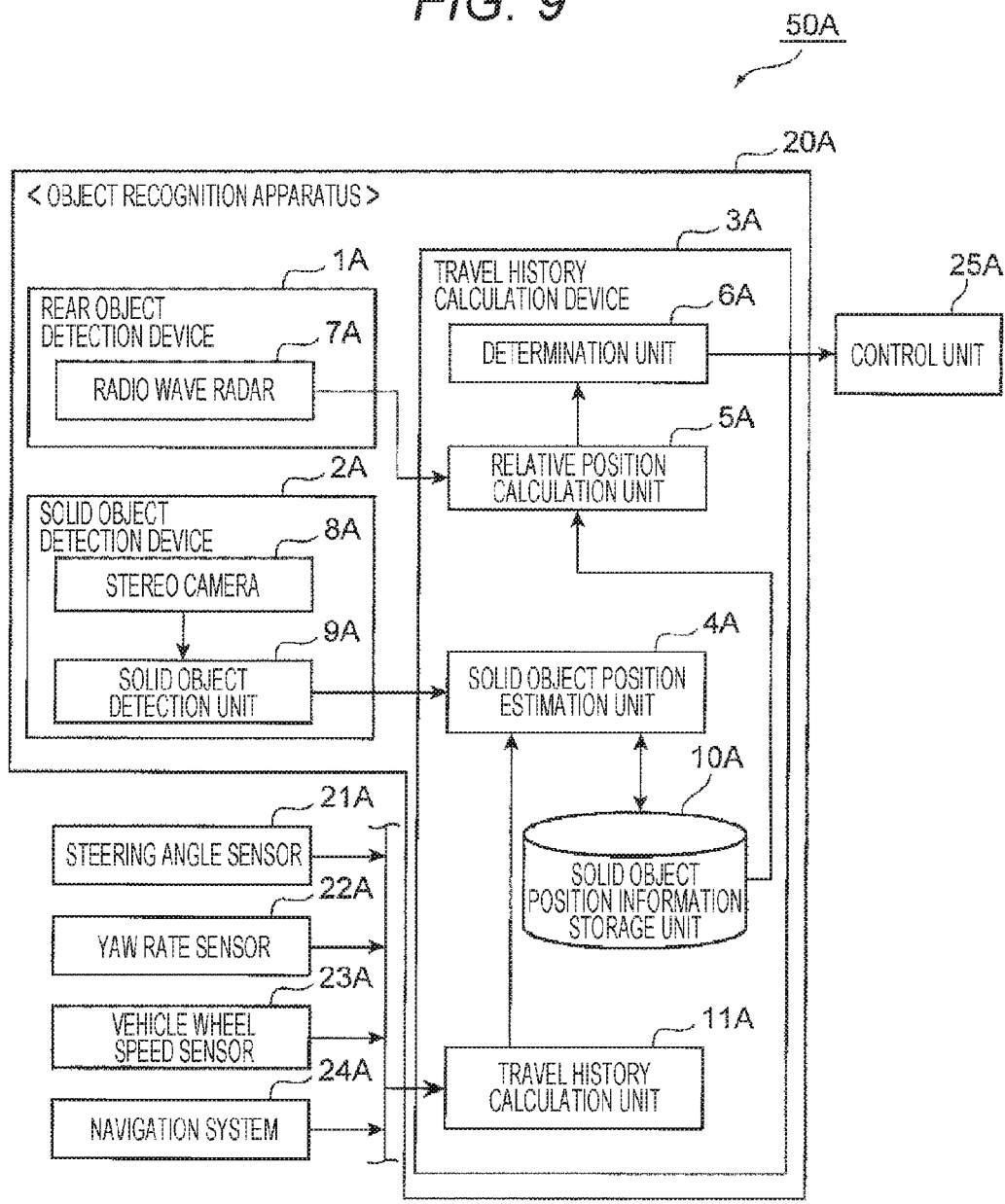
FIG. 9 is a configuration diagram illustrating a configuration of a second embodiment of the vehicle travel controller using the object recognition apparatus according to the invention.

FIG. 9 is a configuration diagram illustrating a configuration of a second embodiment of the vehicle travel controller using the object recognition apparatus according to the invention.

A vehicle travel controller 50A of the second embodiment illustrated in FIG. 9 is different from the above-described vehicle travel controller 50 of the first embodiment in that a stationary object (hereinafter, simply referred to as a solid object) in front of the own vehicle is detected and the other configurations are similar to those of the vehicle travel controller 50 of the first embodiment. Thus, in the description below, only a configuration different from the vehicle travel controller 50 of the first embodiment will be described. Further, the same reference numerals will be given to the same components as those of the first embodiment and a detailed description thereof will be omitted.

As illustrated in the drawings, an object recognition apparatus 20A of the vehicle travel controller 50A includes a rear object detection device 1A, a solid object detection device 2A, and a travel history calculation device 3A.

The solid object detection device 2A is used to detect a solid object (for example, a guardrail or a wall provide along the vehicle lane) in front of the own vehicle and includes, for example, a stereo camera 8A which includes a plurality of cameras (front cameras) arranged on an upper portion of a wind shield of the own vehicle and capturing an image of an environment in front of the own vehicle and a solid object detection unit 9A which detects the solid object in front of the own vehicle on the basis of a plurality of images captured by the stereo camera 8A.

Figure 10:
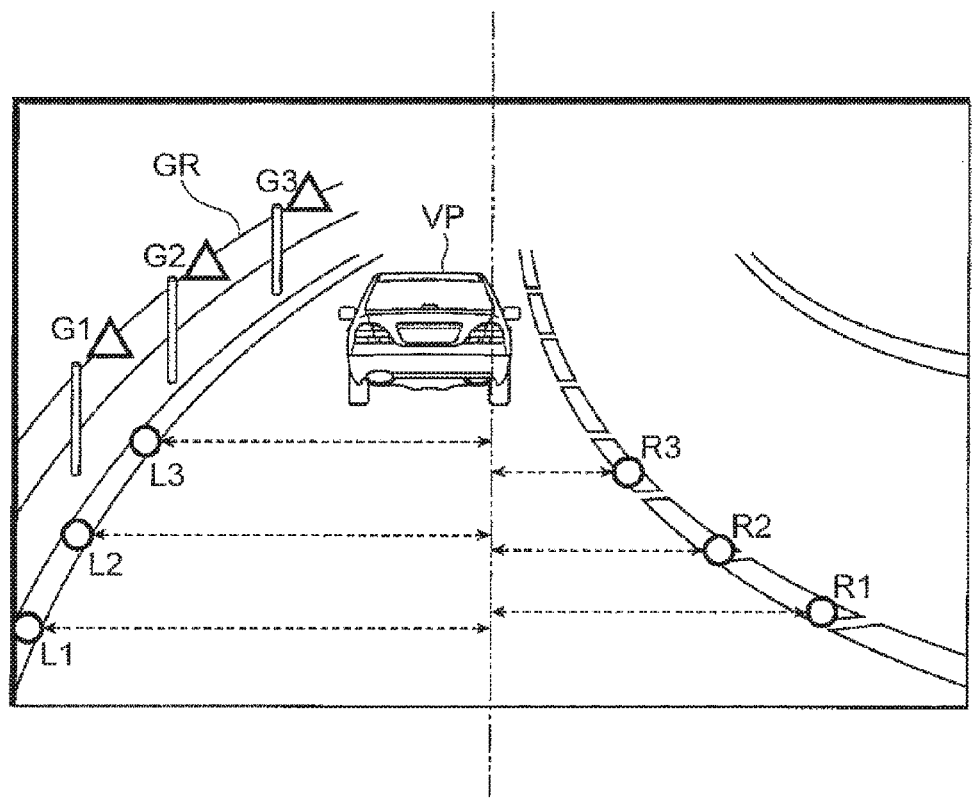
FIG. 10 is a diagram illustrating an example of an image captured by a stereo camera illustrated in FIG. 9.

As illustrated in FIG. 10, the cameras constituting the stereo camera 8A capture an image of a peripheral environment including a preceding vehicle VP traveling at the front side or a guardrail GR corresponding to a road-side solid object and transmit the captured image to the solid object detection unit 9A.

Figure 11:
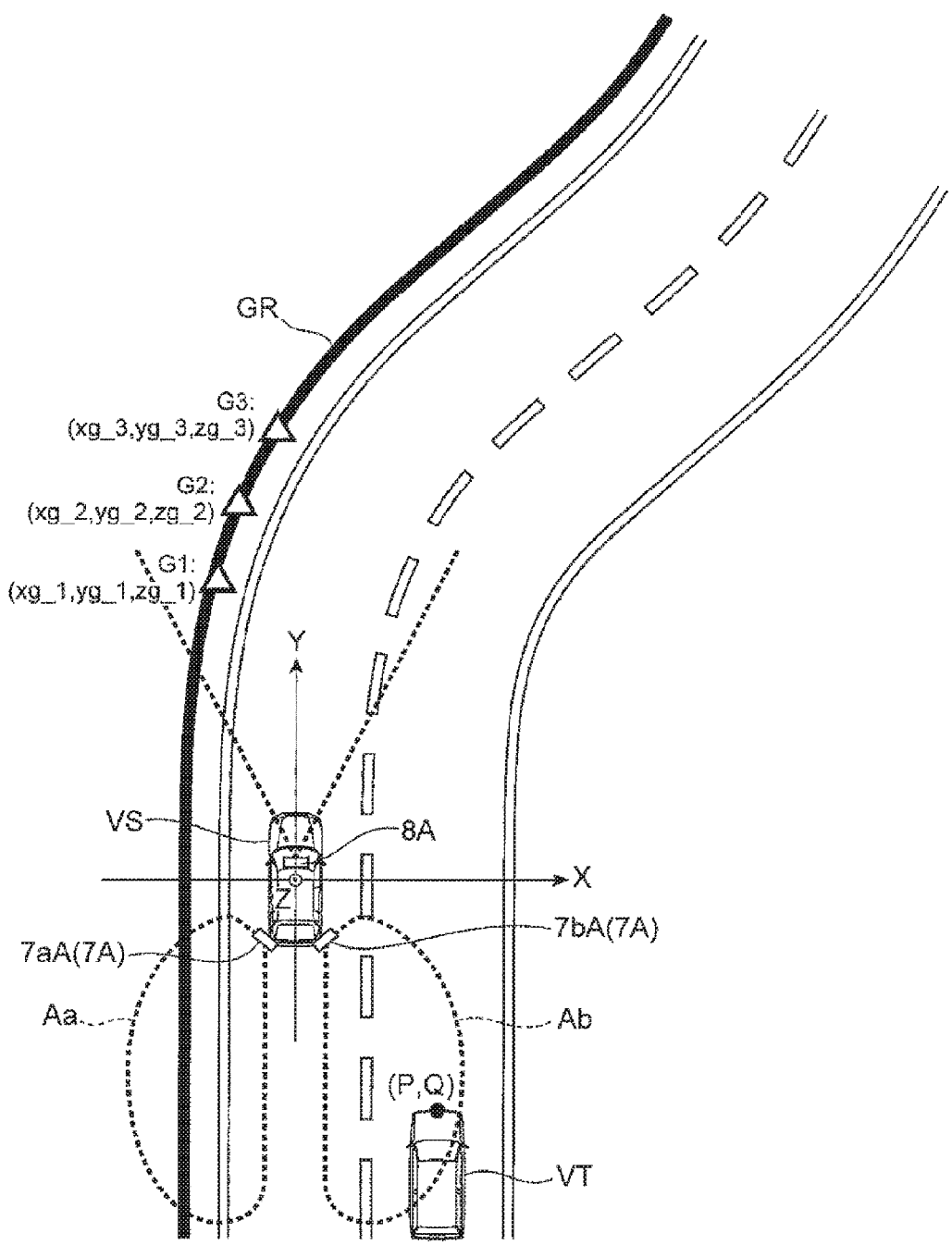
FIG. 11 is a diagram illustrating an example of a positional relation between a rear vehicle and a stationary object with respect to an own vehicle.

The solid object detection unit 9A obtains a parallax for two left and right images on the basis of the information of the left and right images captured by the stereo camera 8A in order to detect the existence of the solid object and to calculate a distance from the own vehicle to the solid object. Further, a size of the solid object including height information from a ground surface is obtained by the obtained distance information and various information items are transmitted to the solid object position estimation unit 4A of the travel history calculation device 3A. In the image captured by the stereo camera 8A in FIG. 10, the representative points of the detected solid object (here, the guardrail GR) are indicated as G1 to G3 in a direction from the front side. Further, in FIG. 11, the position of the representative point of the solid object illustrated in FIG. 10 is indicated by G1: (xg_1, yg_1, zg_1), G2: (xg_2, yg_2, zg_2), and G3: (xg_3, yg_3, zg_3) in a three-dimensional coordinate system X-Y-Z using the own vehicle as an original point. Further, FIGS. 10 and 11 show examples in which the positions of the representative points of the solid object are detected by three points, but the same applies to a case where two points or less or four points or more are detected. Further, when the solid object continuously exist along, for example, the vehicle lane, the positions may be approximated to a line or a curve in the X-Y plane of the coordinate system.

A travel history calculation unit 11A of the travel history calculation device 3A calculates the coordinate system X(n+1)-Y(n+1) using the own vehicle as an original point at the time t(n+1) from the coordinate system X(n)-Y(n) using the center of the own vehicle as an original point at the time t(n) by the calculation described in the first embodiment with reference to FIG. 4 and calculates a position change amount (Δx, Δy) of the own vehicle VS for Δt=(t(n+1)−t(n)). Further, a change in direction of the own vehicle VS is also obtained by the same sequence as that of Equation (2) of the first embodiment and the calculation result is transmitted to the solid object position estimation unit 4A.

The solid object position estimation unit 4A converts the solid object position information output from the solid object detection device 2A to the coordinate system using the center of the own vehicle as an original point at a current time on the basis of a position change amount of the own vehicle obtained by the travel history calculation unit 11A and stores the conversion result in the solid object position information storage unit 10A. Regarding the conversion of the coordinate system at that time, the conversion of the X-Y coordinate system is similar to the conversion indicated by Equation (4) in the first embodiment. However, in the second embodiment, since a change in position of the own vehicle includes a movement in the axial direction within the X-Y plane (in the example illustrated in the drawing, the horizontal plane) and the rotation about the Z axis (the vertical axis), the information (height) in the Z direction of the solid object detected by the solid object detection device 2A is kept at the same value before and after the conversion of the coordinate.

In this way, the solid object position estimation unit 4A converts the solid object position detected in the past into the coordinate system using the center of the own vehicle as an original point at a current time on the basis of the information obtained from the travel history calculation unit 11A and the conversion result is stored in the solid object position information storage unit 10A. At the same time, the solid object position estimation unit 4A acquires solid object position information at a current time point from the solid object detection device 2A and additionally stores the solid object position information in the solid object position information storage unit 10A.

Figure 12:
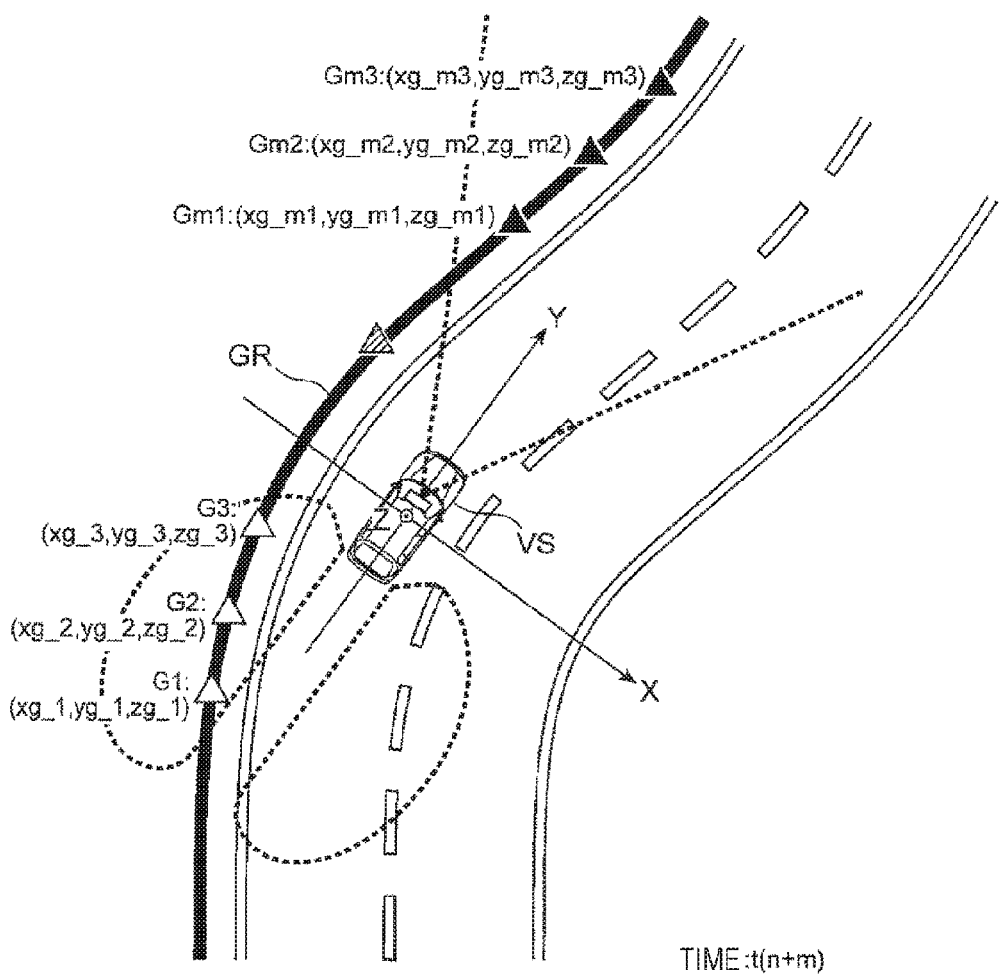
FIG. 12 is a diagram illustrating an example of solid object position information stored in a solid object position information storage unit illustrated in FIG. 9.

Specifically, as illustrated in FIG. 12, the solid object position estimation unit 4A first stores the solid object position information output from the solid object detection device 2A at the time t(n) in the solid object position information storage unit 10A. For example, as illustrated in FIGS. 10 and 11, as for the position information of the solid object obtained from the image captured by the stereo camera 8A, the coordinate information (xg_1(t(n)), yg_1(t(n)), zg_1(t(n))), (xg_2(t(n)), yg_2(t(n)), zg_2(t(n))), (xr_3(t(n)), yr_3(t(n)), zg_3(t(n))) is stored as the position and height information items G1 to G3 in the coordinate system X-Y-Z using the center of the own vehicle as an original point at the time t(n).

Next, when the time elapses from t(n) to t(n+1), the solid object position estimation unit 4A converts the position information items G1 to G3 of the solid object to the position information in the coordinate system X(n+1)-Y(n+1)-Z(n+1) using the center of the own vehicle as an original point at the time t(n+1) by Equation (4) above and stores the conversion result in the solid object position information storage unit 10A.

In accordance with a series of conversion, three-dimensional coordinate information from the position information items G1 to G3 of the solid object detected at the time t(n) to the position information items Gm1 to Gm3 of the solid object detected at the time t(n+m) is totally stored in the solid object position information storage unit 10A at the time t(n+m).

In addition, the solid object position information storage unit 10A stores the solid object position information altogether from the past. However, it is practically to sequentially delete the solid object position information stored for a predetermined time or more or the solid object position information in which a distance from the own vehicle becomes a predetermined value or more from the solid object position information storage unit 10A in order to prevent the overflow of the storage capacity.

In this way, when the solid object position information is recognized in time and the past solid object position information is used, the position of the solid object behind the own vehicle can be accurately estimated.

The relative position calculation unit 5A is used to calculate a relative position of an object detected by the rear object detection device 1A with respect to the position of the solid object behind the own vehicle stored in the solid object position information storage unit 10A.

Figure 13:
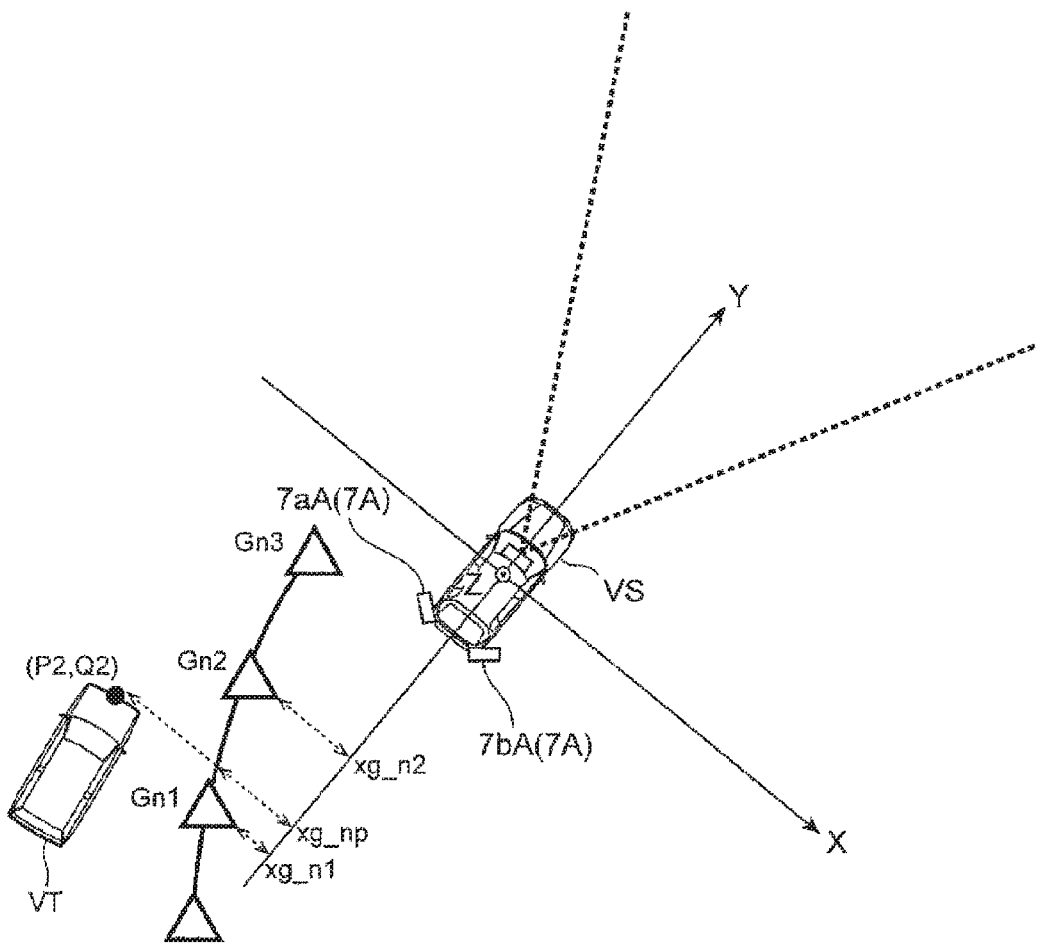
FIG. 13 is a diagram illustrating an example of a positional relation between a rear vehicle and a stationary object with respect to an own vehicle.
Figure 14:
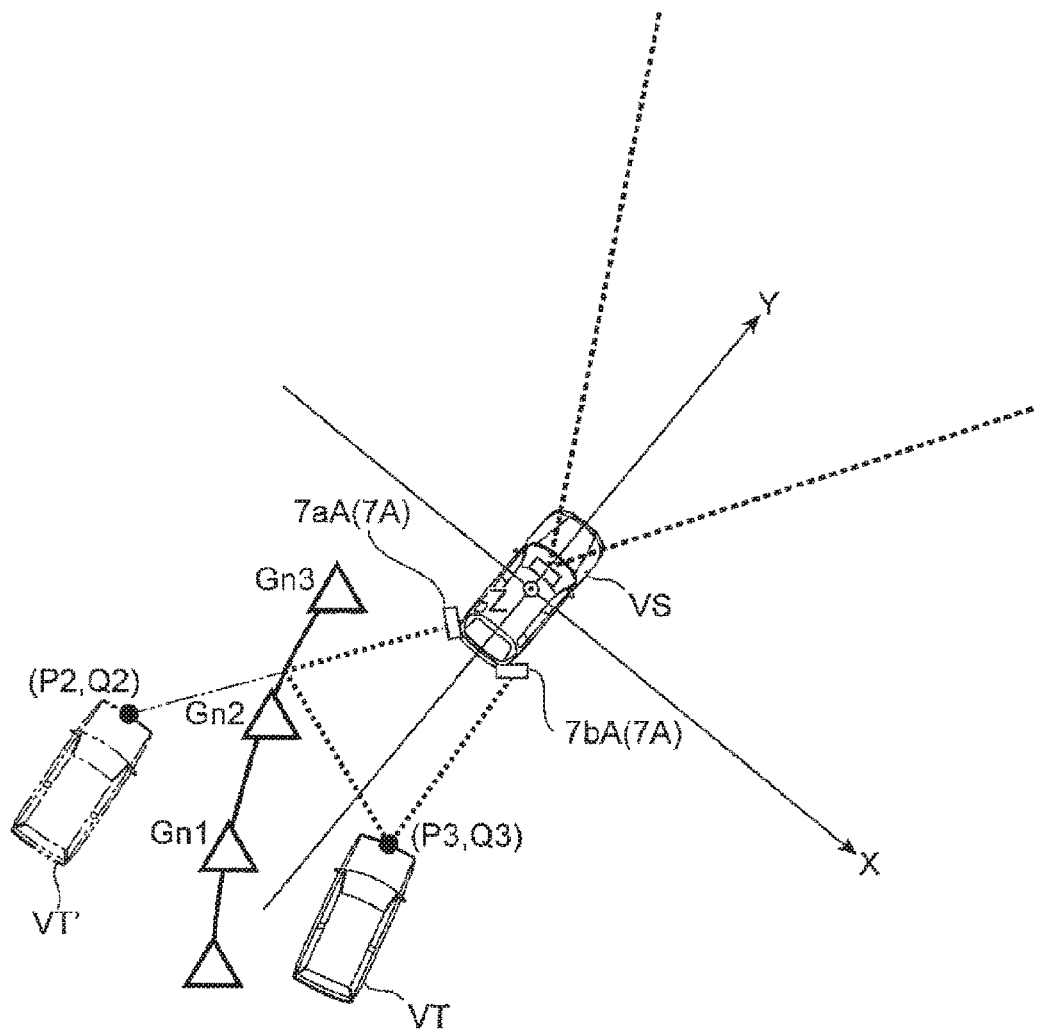
FIG. 14 is a diagram illustrating another example of a positional relation between a rear vehicle and a stationary object with respect to an own vehicle.

Specifically, when the rear object detection device 1A detects the left rear target vehicle VT and the relative speed and the position (P2, Q2) of the target vehicle VT with respect to the own vehicle VS in the X-Y plane of the coordinate system using the center of the own vehicle as an original point as illustrated in FIG. 13 or 14, the relative position calculation unit 5A selects two points closest to each other in the traveling direction (the Y-axis direction) of the own vehicle VS from the solid object position information stored in the solid object position information storage unit 10A. In FIG. 13, the solid object position information items Gn1 and Gn2 are closest to each other in the Y-axis direction. Then, the relative position calculation unit 5A obtains a line connecting the positions Gn1 and Gn2 of two representative points of the solid object, obtains an X-direction distance xg_np at a place corresponding to the position of the target vehicle VT in the Y-axis direction of the line, calculates a large/small relation between the value of the distance xg_np and the value P2 in the X-axis direction of the target vehicle VT, and transmits the calculation result to the determination unit 6A.

The determination unit 6A determines whether the object detected by the rear object detection device 1A exists in a predetermined area (for example, an area where the reliability of the detection result obtained by the rear detection device 1A is low, that is, an area where the object detected by the rear object detection device 1A is erroneously detected due to the influence of the solid object) on the basis of the large/small relation transmitted from the relative position calculation unit 5A.

Specifically, the determination unit 6A determines whether the target vehicle VT exists at the inside (the own vehicle side) of the solid object or the outside (the opposite side to the own vehicle), for example, as illustrated in FIG. 13 on the basis of the large/small relation transmitted from the relative position calculation unit 5A, determines an influence of the solid object with respect to the detection result of the target vehicle VT obtained by the radio wave radar 7A, and transmits the determination result to the control unit 25A. For example, when the height included in the position information items Gn1 and Gn2 of two representative points of the solid object is higher than the attachment position of the radio wave radar 7A, it is considered that the radio wave output from the radio wave radar 7A does not reach a position far from a line connecting two representative points of the solid object. FIG. 13 illustrates an example in which the value P2 in the X-axis direction of the target vehicle VT is larger than the distance xg_np from the Y axis to the solid object. However, in such a case, it is determined that the reliability of the detection result of the target vehicle VT obtained by the rear object detection device 1A is low.

Further, for example, FIG. 14 illustrates an example in which a target vehicle VT' is detected by a radio wave radar 7aA attached to a left rear part of the own vehicle VS, the target vehicle VT is detected by a radio wave radar 7bA attached to a right rear part of the own vehicle VS, and the position information items Gn1, Gn2, and Gn3 of three representative points of the solid object are obtained by the solid object position estimation unit 4A. In such a case, it is expected that the radio wave emitted from the radio wave radar 7A is reflected by the solid object having a continuous shape. Thus, the target vehicle VT detected by the radio wave radar 7bA is real information, but the target vehicle VT' detected by the radio wave radar 7aA may be information of an erroneous target vehicle (a ghost of the target vehicle VT) detected by the reflection of the radio wave from the solid object. For that reason, even in such a case, it is determined that the reliability of the detection result of the target vehicle VT obtained by the rear object detection device 1A is low.

In addition, in the examples illustrated in FIGS. 13 and 14, the position information of the solid object is indicated by continuous dots, but when the solid object exists continuously along, for example, a road, the position information is approximated to a line or a curve. Then, this information may be stored as the position information of the solid object in the three-dimensional coordinate system X-Y-Z.

The control unit 25A generates various control signals for controlling the travel state and the like of the own vehicle on the basis of the information transmitted from (the determination unit 6A of the travel history calculation device 3A of) the object recognition apparatus 20A.

Specifically, when the determination unit 6A determines that the object detected by the rear object detection device 1A exists in a predetermined area (for example, an area where the reliability of the detection result obtained by the rear object detection device 1A is low), the control unit 25A determines that there is low necessity for, for example, a steering control (regulation), a vehicle speed control for the own vehicle, and a warning (a warning sound or a warning display) for the driver described in the first embodiment and generates control signals for cancelling or suppressing the control.

Figure 15:
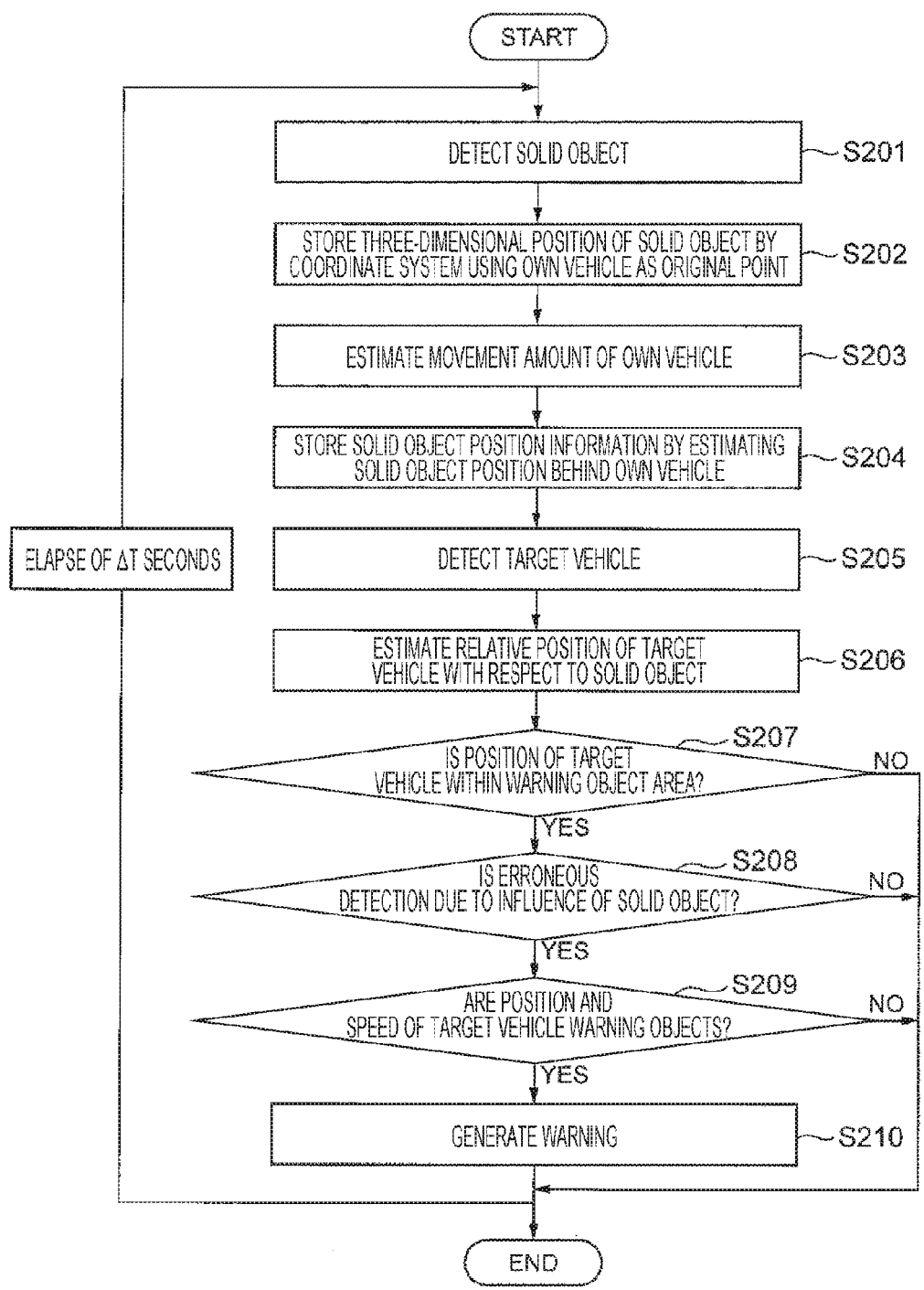
FIG. 15 is a flowchart illustrating a process flow of the vehicle travel controller illustrated in FIG. 9.

A flow of a series of processes which is performed by the above-described vehicle travel controller 50A will be described with reference to FIG. 15. First, in step S201, a solid object position in the three-dimensional coordinate system X-Y-Z using the own vehicle as an original point is obtained by the solid object detection device 2A of the object recognition apparatus 20A according to the method described with reference to FIGS. 10 and 11.

Next, in step S202, the solid object position obtained in step S201 is stored in the solid object position information storage unit 10A as the coordinate system using the own vehicle as an original point by the solid object position estimation unit 4A of the travel history calculation device 3A.

Next, in step S203, the movement amount of the own vehicle for $\Delta t$ seconds is estimated on the basis of the information obtained by the steering angle sensor 21A, the yaw rate sensor 22A, the vehicle wheel speed sensor 23A, and the navigation system 24A constituting the vehicle travel controller 50A by the travel history calculation unit 11A. The process in step S203 is similar to the process in step S103 of FIG. 8.

Next, in step S204, the solid object position information detected in the past by the solid object detection device 2A using Equation (4) above is converted to the coordinate system using the own vehicle as an original point at a current time by the solid object position estimation unit 4A to estimate the solid object behind the own vehicle position and is stored in the solid object position information storage unit 10A.

Next, in step S205, the rear object (the target vehicle or the like) including the rear side is detected by the rear object detection device 1A and the position coordinate (P, Q) of the target vehicle is obtained. The process in step S205 is similar to the process in step S105 of FIG. 8.

Next, in step S206, a relative position between the solid object position information stored in step S204 and the target vehicle detected in step S205 is obtained by the relative position calculation unit 5A. More specifically, as described above, when the rear object detection device 1A detects the target vehicle and detects the position (P, Q) of the target vehicle in the X-Y plane of the three-dimensional coordinate system using the own vehicle as an original point, the solid object position information of two points closest to each other in the traveling direction (the Y-axis direction) of the own vehicle is selected from the solid object position information stored in the solid object position information storage unit 10A. When an X-direction distance between the target vehicle and the position of the representative point of the solid object for two points closes to each other in the Y-axis direction is obtained, a relative position of the target vehicle with respect to the solid object can be estimated.

Next, in step S207, it is determined whether the target vehicle behind the own vehicle exists in an area (a vehicle lane) corresponding to a warning object. In general, this determination is made based on a certain position of the target vehicle with respect to the own vehicle. However, when the vehicle lane position information described in the first embodiment is obtained, it is possible to accurately determine a certain vehicle lane (a vehicle lane on which the own vehicle travels, a right adjacent vehicle lane, a left adjacent vehicle lane, or two or more separated vehicle lanes) on which the target vehicle travels.

When it is determined that the target vehicle exists in an area (a vehicle lane) corresponding to a warning object in step S207, it is determined whether the vehicle detected by the rear object detection device 1A exists in an area where the reliability of the detection result obtained by the rear object detection device 1A is low, that is, the vehicle detected by the rear object detection device 1A is a vehicle erroneously detected by the influence of the solid object in step S208 according to the method described with reference to FIGS. 13 and 14 on the basis of the information of the relative position of the target vehicle with respect to the solid object obtained in step S206.

When it is determined that the vehicle detected by the rear object detection device 1A is not a vehicle erroneously detected by the influence of the solid object in step S208, it is determined whether a warning sound is actually output due to the target vehicle on the basis of the information of the position and the speed (for example, information on whether the target vehicle approaches the own vehicle) of the target vehicle in step S209.

Then, when it is determined that a warning sound needs to be actually output in step S209, a control signal is generated by the control unit 25A to output a warning sound in step S210.

Figure 8:
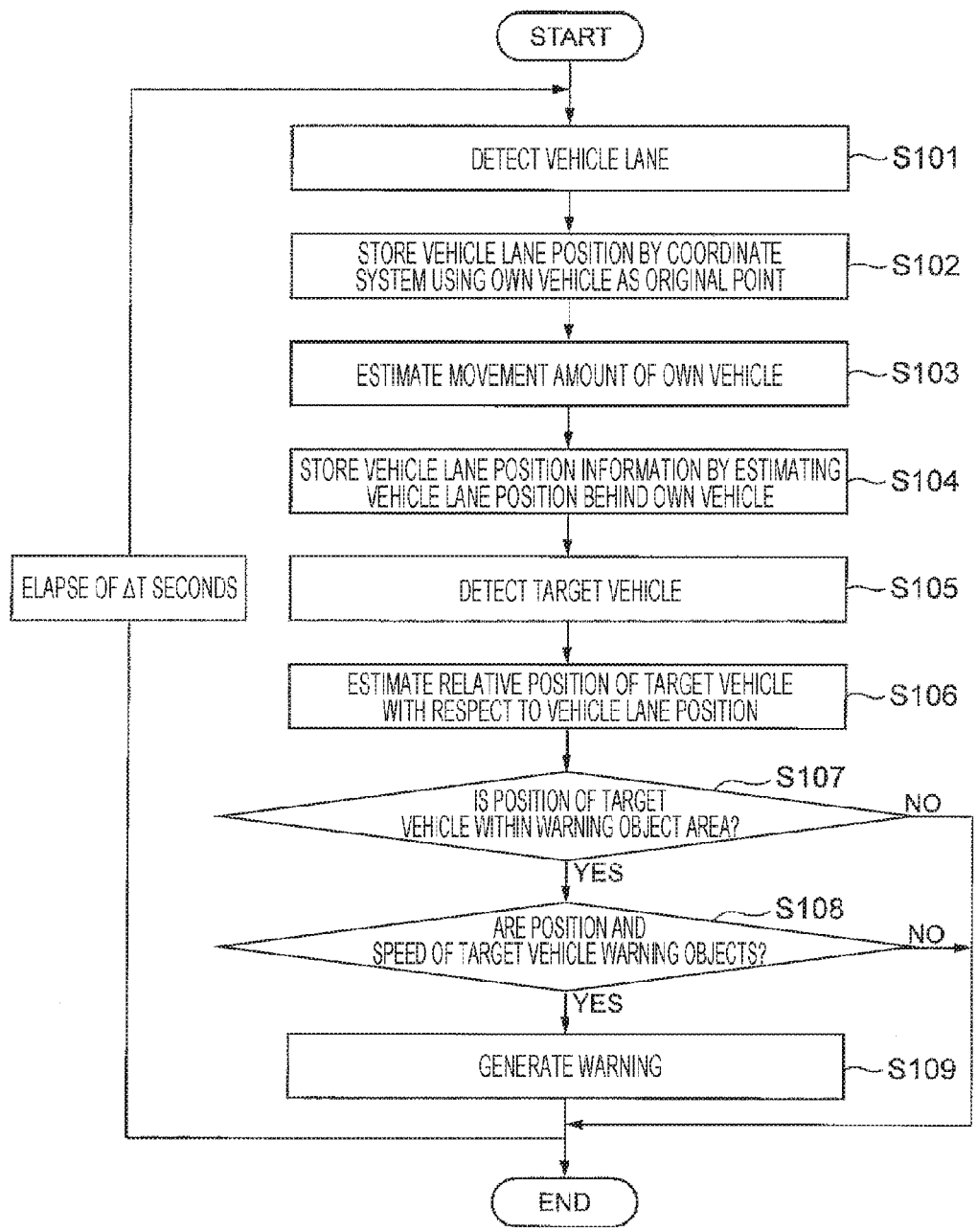
FIG. 8 is a flowchart illustrating a process flow of the vehicle travel controller illustrated in FIG. 1.

The processes in step S209 and step S210 are similar to those of step S108 and step S109 of FIG. 8.

In addition, a series of these processes are repeated whenever ΔT seconds elapse.

In this way, according to the second embodiment, in the vehicle that detects an object existing at the rear side including the oblique rear side of the own vehicle by the radio wave radar 7A such as a millimeter wave radar, the solid object in front of the own vehicle is detected on the basis of a plurality of images captured by the stereo camera 8A capturing an image of an environment in front of the own vehicle, the position of the solid object behind the own vehicle is estimated on the basis of the detected solid object and the travel history of the own vehicle, and the relative position of the object existing behind the own vehicle with respect to the estimated position of the solid object is calculated. Accordingly, it is possible to accurately recognize the position of the object existing at the rear side including the oblique rear side of the own vehicle, that is, the vehicle lane on which the object is located.

<Third Embodiment>

Figure 16:
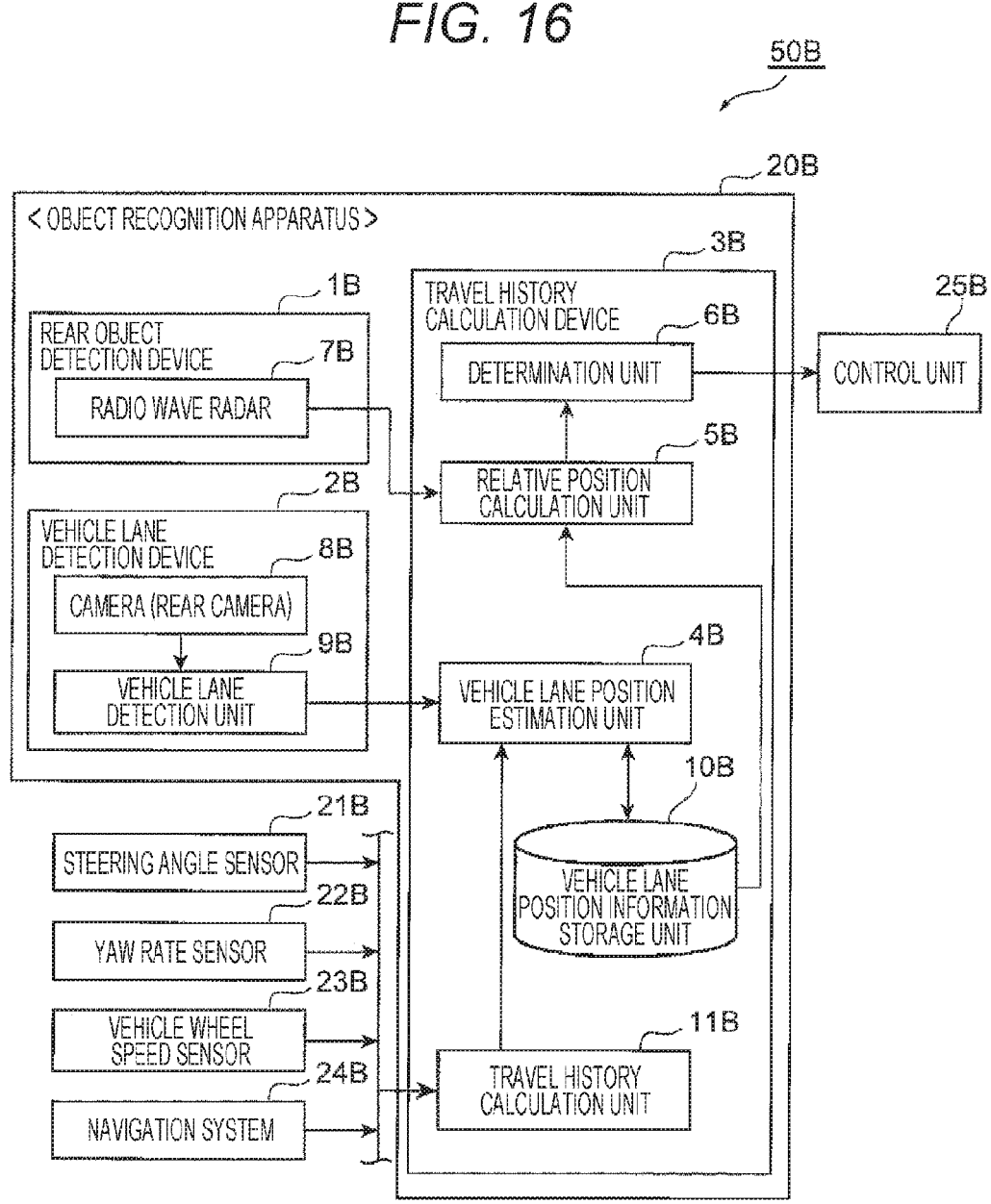
FIG. 16 is a configuration diagram illustrating a configuration of a third embodiment of the vehicle travel controller using the object recognition apparatus according to the invention.

FIG. 16 is a configuration diagram illustrating a third embodiment of a vehicle travel controller using the object recognition apparatus according to the invention.

A vehicle travel controller 50B of the third embodiment illustrated in FIG. 16 is different from the above-described vehicle travel controller 50 of the first embodiment in that a vehicle lane behind the own vehicle is detected by a camera capturing an image of an environment behind the own vehicle and the other configurations are similar to those of the vehicle travel controller 50 of the first embodiment. Thus, in the description below, only a configuration different from the vehicle travel controller 50 of the first embodiment will be described. Further, the same reference numerals will be given to the same components as those of the first embodiment and a detailed description thereof will be omitted.

As illustrated in the drawings, an object recognition apparatus 20B of the vehicle travel controller 50B includes a rear object detection device 1B, a vehicle lane detection device 2B, and a travel history calculation device 3B similarly to the vehicle travel controller 50 of the first embodiment. However, in the third embodiment, a camera (an image sensing device) 8B of the vehicle lane detection device 2B is attached to the rear side of the own vehicle (see FIG. 18).

The vehicle lane detection device 2B is used to detect a vehicle lane (a vehicle travel lane) behind the own vehicle and includes, for example, the camera (the rear camera) (the image sensing device) 8B which is disposed at the rear part of the own vehicle and captures an image of an environment behind the own vehicle and a vehicle lane detection unit 9B which detects a vehicle lane behind the own vehicle on the basis of the image captured by the camera 8B.

The camera 8B is configured as, for example, a CMOS camera and is attached to the own vehicle to have an optical axis directed obliquely downward at the rear side of the own vehicle.

Figure 17:
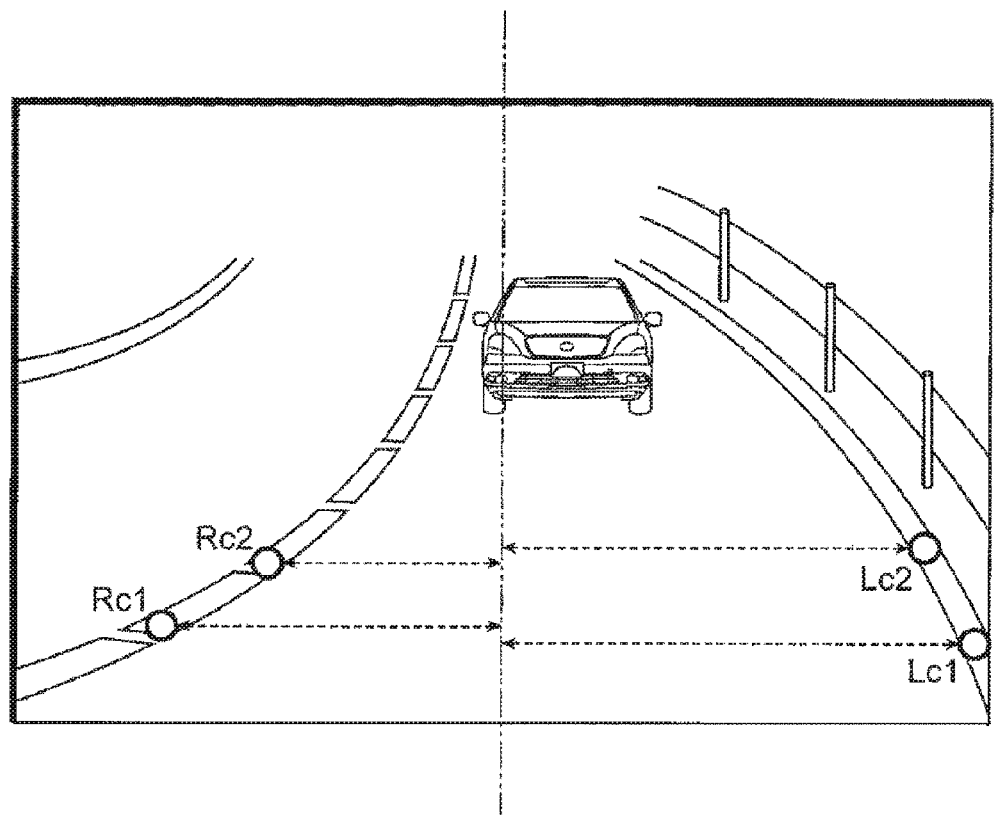
FIG. 17 is a diagram illustrating an example of an image captured by a camera illustrated in FIG. 16.

Then, as illustrated in FIG. 17, the camera 8B captures an image of a peripheral environment including a road in the range of about 10 m behind the own vehicle and transmits the captured image to the vehicle lane detection unit 9B. Further, here, a detection area (an image capturing area) Ac of the camera 8B is smaller than detection areas Aa and Ab of radio wave radars 7B (7aB and 7bB) constituting the rear object detection device 1B. More specifically, the detection areas Aa and Ab behind the own vehicle of the radio wave radars 7B (7aB and 7bB) are larger than a detection area (an image capturing area) Ac behind the own vehicle of the camera 8B. Thus, the radio wave radars 7B (7aB and 7bB) are able to detect an object existing at the further rear side (particularly, the rear side) from the own vehicle in relation to the camera 8B (see FIG. 18).

Figure 18:
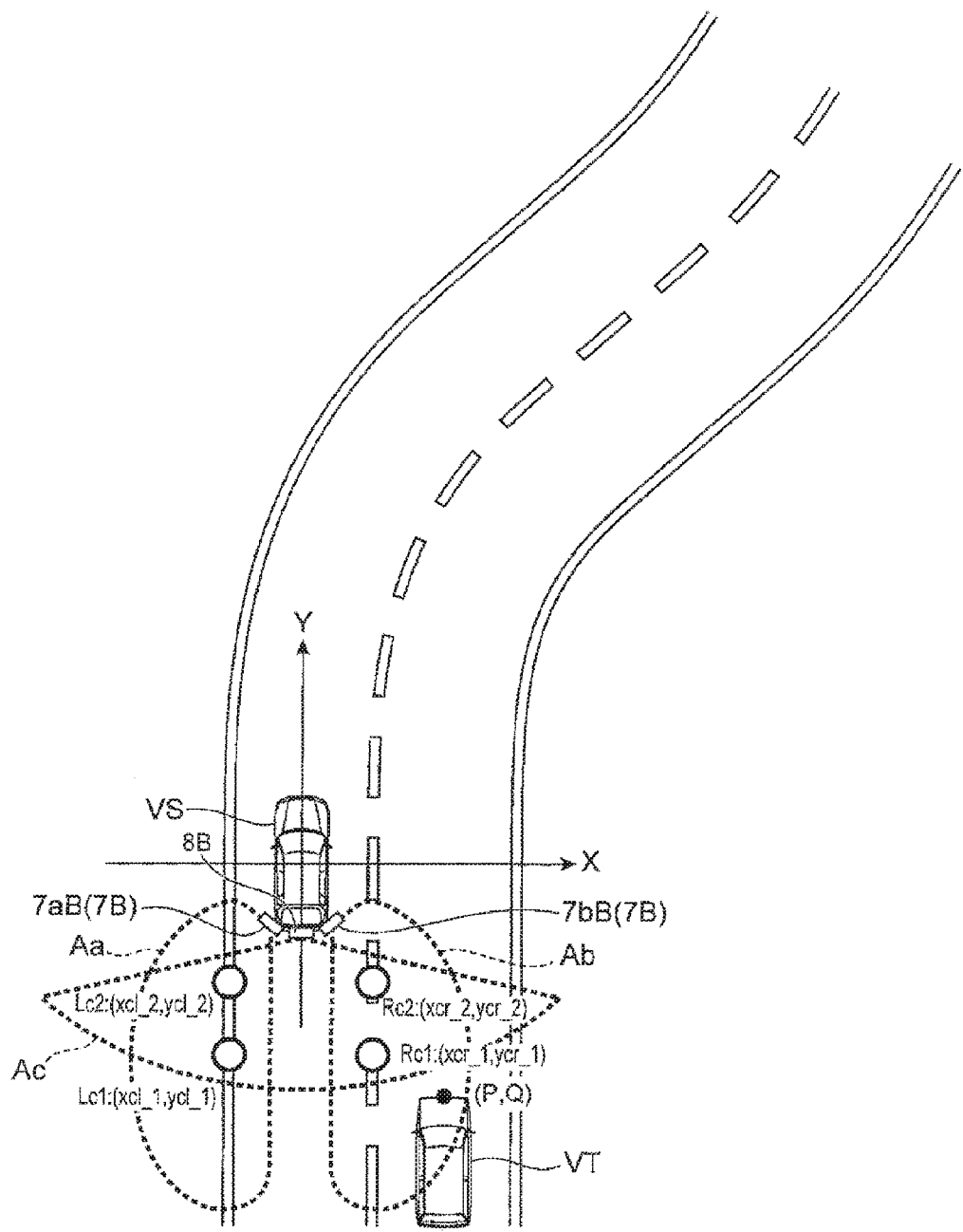
FIG. 18 is a diagram illustrating an example of a positional relation between a rear vehicle and a vehicle lane with respect to an own vehicle.

The vehicle lane detection unit 9B performs, for example, a binarization process or a feature point extraction process based on the image captured by the camera 8B to select a pixel (a road dividing line candidate point) which is considered as a road dividing line (a white line, a yellow line, a broken line, or bott's-dots) on a road from the image, recognizes continuously arranged road dividing line candidate points as a road dividing line constituting the vehicle lane to obtain the position thereof, and transmits information on the position to the vehicle lane position estimation unit 4B of the travel history calculation device 3B. In the image captured by the camera 8B illustrated in FIG. 17, the positions of the road dividing line at the right side (the right side when viewed in the traveling direction of the vehicle) are indicated by Rc1 and Rc2 in a direction from the front side and the positions of the road dividing line at the left side (the left side when viewed in the traveling direction of the vehicle) are indicated by Lc1 and Lc2 in a direction from the front side. In FIG. 18, as for the positions of the road dividing lines illustrated in FIG. 17, the positions in the coordinate system X-Y using the center of the own vehicle as an original point are respectively indicated by Rc1: (xcr_1, ycr_1), Rc2: (xcr_2, ycr_2), Lc1: (xcl_1, ycl_1), and Lc2: (xcl_2, ycl_2). Additionally, in FIGS. 17 and 18, examples are described in which the position of the road dividing line is obtained as two points for each of the left and right sides, but the same applies to a case where one or three points or more are obtained or a case where the position is approximated to a line or a curve.

Further, various methods have been developed to recognize the road dividing line or the vehicle lane defined by the road dividing line. For example, a method of extracting a road shoulder or a median strip by a pattern matching can be also used. Further, the vehicle lane detection device 2B can be, of course, commonly used together with various vehicle lane detection devices used in, for example, a vehicle lane keep assist device (also referred to as a lane keep assist) or a vehicle lane departure warning device (also referred to as a lane departure warning).

A travel history calculation unit 11B of the travel history calculation device 3B calculates the coordinate system X(n+1)-Y(n+1) using the own vehicle as an original point at the time t(n+1) from the coordinate system X(n)-Y(n) using the center of the own vehicle as an original point at the time t(n) by the calculation described with reference to FIG. 4 in the first embodiment and calculates a position change amount ($\Delta x$, $\Delta y$) of the own vehicle VS for $\Delta t = (t(n+1)-t(n))$. Further, a change in direction of the own vehicle VS is also obtained by the same sequence as that of Equation (2) of the first embodiment and the calculation result is transmitted to the solid object position estimation unit 4B.

The vehicle lane position estimation unit 4B converts the vehicle lane position detected in the past to the coordinate system using the center of the own vehicle as an original point at a current time on the basis of the information obtained from the travel history calculation unit 11B by the calculation described with reference to FIG. 4 in the first embodiment and stores the conversion result in the vehicle lane position information storage unit 10B. At the same time, the vehicle lane position estimation unit 4B acquires the vehicle lane position information at a current time point from the vehicle lane detection device 2B and additionally stores the vehicle lane position information in the vehicle lane position information storage unit 10B.

Figure 19:
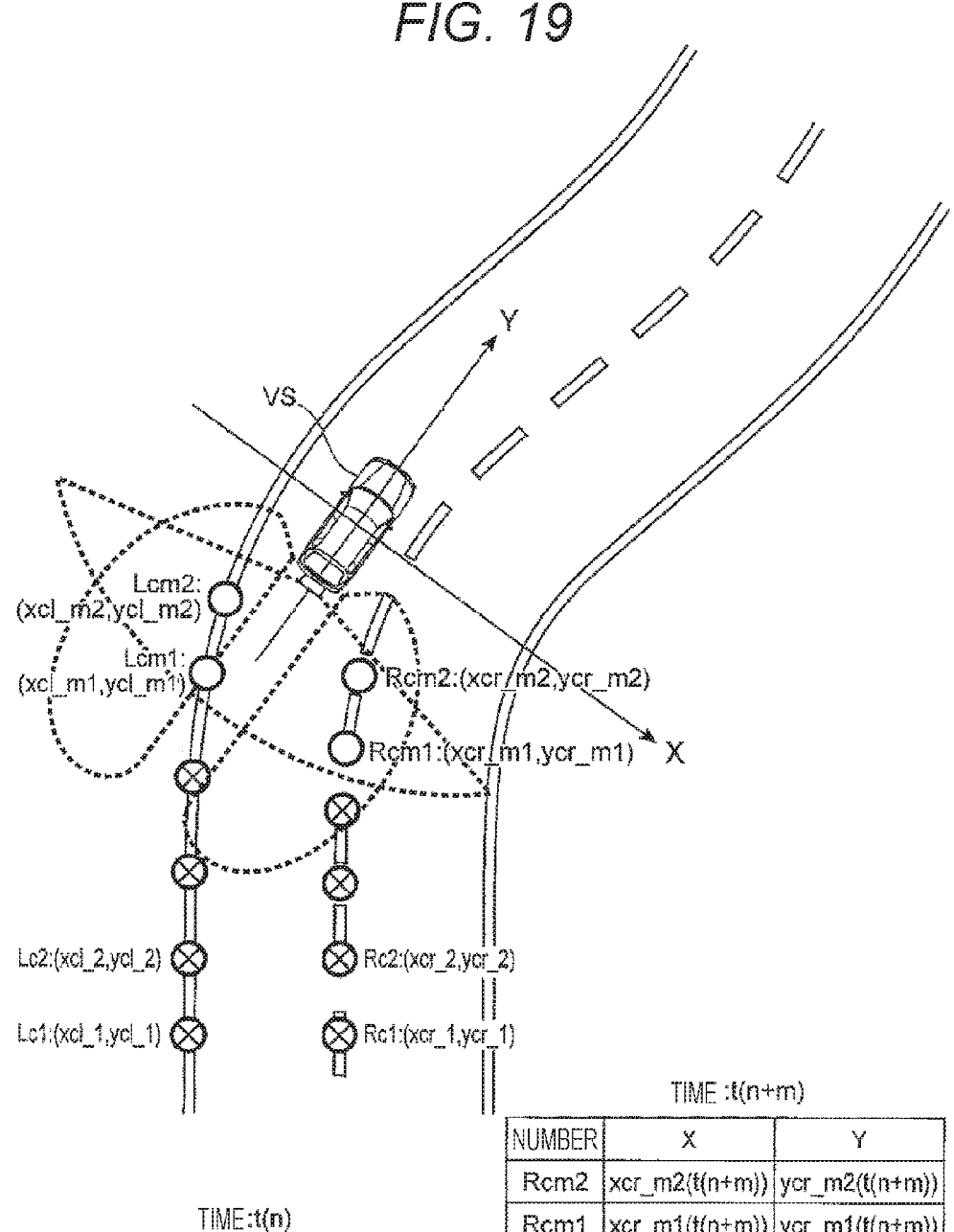
FIG. 19 is a diagram illustrating an example of vehicle lane position information stored in a vehicle lane position information storage unit illustrated in FIG. 16.
Figure 20:
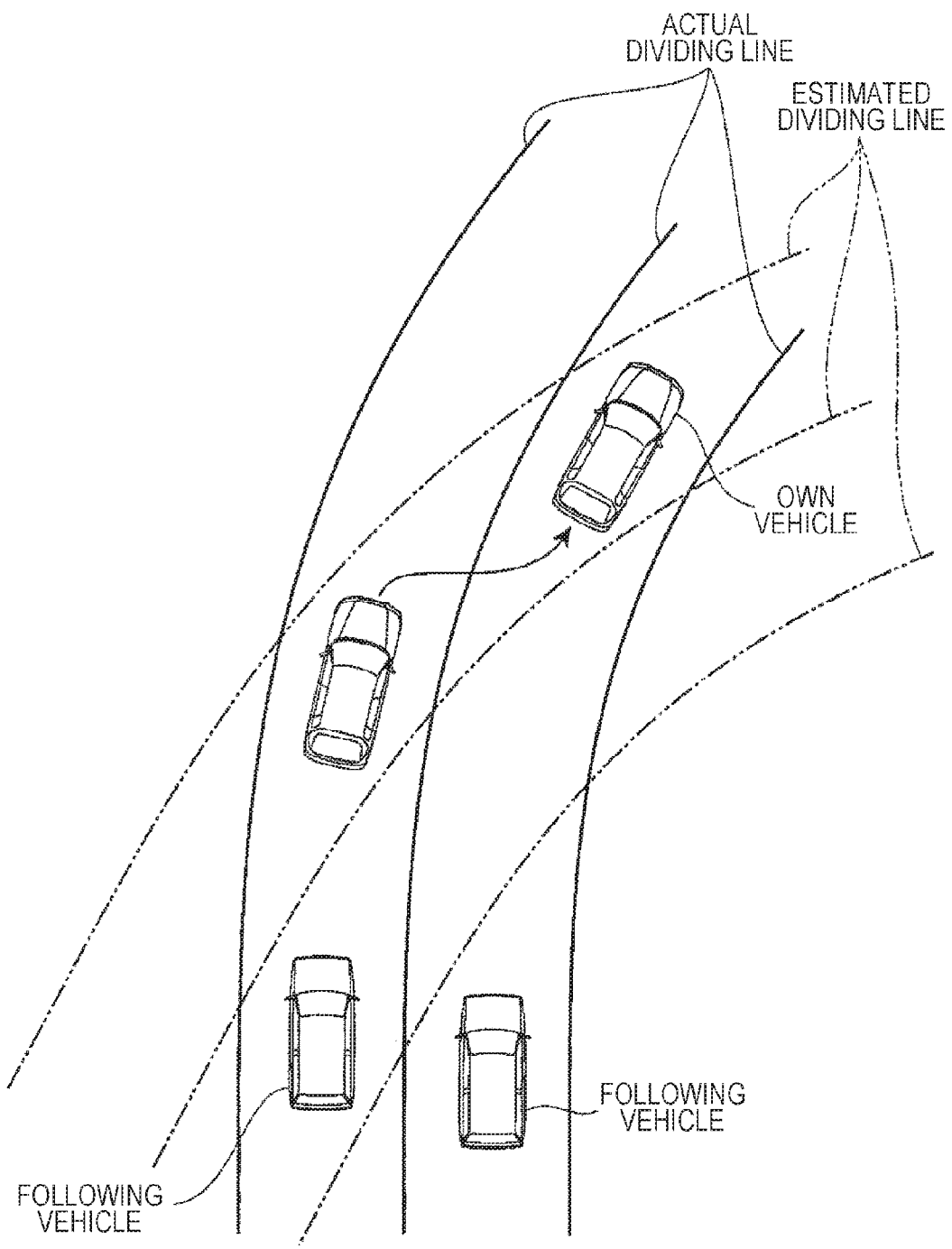
FIG. 20 is a diagram illustrating a position of a rear object detected by a background art.

Specifically, as illustrated in FIG. 19, the vehicle lane position estimation unit 4B first stores the vehicle lane position information output from the vehicle lane detection device 2B at the time t(n) in the vehicle lane position information storage unit 10B. For example, as illustrated in FIGS. 17 and 18, the coordinate information (xcr_1(t(n)), ycr_1(t(n))), (xcr_2(t(n)), ycr_2(t(n))) is stored while a position (that is, vehicle lane information) of a right road dividing line obtained from an image captured by the camera 8B is set as positions Rc1 and Rc2 of the coordinate system X-Y using the center of the own vehicle as an original point at the time t(n). Similarly, although there is no description in FIG. 19, the coordinate information (xcl_1(t(n)), ycl_1(t(n))), (xcl_2(t(n)), ycl_2(t(n))) is stored while a position (that is, vehicle lane information) of a left road dividing line obtained from an image captured by the camera 8B is set as positions Lc1 and Lc2 in the coordinate system X-Y using the center of the own vehicle as an original point.

Next, when the time elapses from t(n) to t(n+1), the vehicle lane position estimation unit 4B converts the positions Rc1 and Rc2 of the right road dividing line and the positions Lc1 and Lc2 of the left road dividing line to the position information in the coordinate system X(n+1)-Y(n+1) using the center of the own vehicle as an original point at the time t(n+1) by Equation (4) above and stores the conversion result in the vehicle lane position information storage unit 10B.

In accordance with a series of conversion, coordinate information from the positions Rc1 and Rc2 of the right road dividing line detected at the time t(n) to the positions Rcm1 and Rcm2 of the right road dividing line detected at the time t(n+m) is stored as the vehicle lane position information in the vehicle lane position information storage unit 10B at the time t(n+m) (see FIG. 19). Similarly, even in the left road dividing line, the position information of the road dividing line detected by the vehicle lane detection device 2B from the time t(n) to the time t(n+m) is stored as the vehicle lane position information in the vehicle lane position information storage unit 10B.

In addition, the vehicle lane position information storage unit 10B stores the vehicle lane position information altogether from the past. However, it is practical to sequentially delete the vehicle lane position information stored for a predetermined time or more or the vehicle lane position information in which a distance from the own vehicle becomes a predetermined value or more from the vehicle lane position information storage unit 10B in order to prevent the overflow of the storage capacity.

In this way, when the vehicle lane position information is recognized in time and the past vehicle lane position information is used, the vehicle lane position behind the own vehicle (the vehicle lane position behind the detection area (the image capturing area) Ac of the camera 8B) can be accurately estimated.

The relative position calculation unit 5B and the determination unit 6B determine, for example, whether the rear target vehicle VT exists on the right adjacent vehicle lane with respect to the vehicle lane on which the own vehicle VS travels (see FIG. 6) or the target vehicle VT exists at the rear side of the same vehicle lane on which the own vehicle VS travels (see FIG. 7) by the calculation described with reference to FIGS. 4 to 7 in the first embodiment.

The control unit 25B, can also generate various control signals for controlling the travel state and the like of the own vehicle on the basis of the information transmitted from (the determination unit 6B of the travel history calculation device 3B of) the object recognition apparatus 20B by the calculation described in the first embodiment.

In addition, since a flow of a series of processes performed by the vehicle travel controller 50B of the third embodiment is substantially similar to a flow of a series of processes performed by the vehicle control device 50 of the first embodiment, a detailed description thereof will be omitted.

In this way, according to the third embodiment, for example, in the vehicle that detects an object existing at the rear side including the oblique rear side of the own vehicle by the radio wave radar 7B such as a millimeter wave radar having a large detection range behind the own vehicle compared with the camera 8B, the vehicle lane behind the own vehicle is detected on the basis of the image captured by the camera 8B capturing an image of an environment behind the own vehicle, the position of the vehicle lane at the rear side (particularly, the rear side of the detection area (the image capturing area) Ac of the camera 8B) of the own vehicle is estimated on the basis of the detected vehicle lane and the travel history of the own vehicle, and the relative position of the object existing behind the own vehicle with respect to the estimated position of the vehicle lane is calculated. Accordingly, it is possible to accurately and promptly recognize the position of the object existing at the rear side including the oblique rear side of the own vehicle, that is, the vehicle lane on which the object is located even when the own vehicle travels on a curve or changes the vehicle lane.

In addition, in the description above, the first embodiment, the second embodiment, and the third embodiment have been described separately. However, a combination of these embodiments may be used. That is, the vehicle lane and the solid object at the front or rear side of the own vehicle are detected on the basis the image captured by the camera capturing an image of a front or rear environment, the positions of the vehicle lane and the solid object behind the own vehicle are estimated on the basis of the detected vehicle lane, the detected solid object, and the travel history of the own vehicle, and the relative positions of the object existing behind the own vehicle with respect to the estimated positions of the vehicle lane and the solid object are calculated. Accordingly, it is possible to further accurately recognize the position of the object existing at the rear side including the oblique rear side of the own vehicle, that is, the vehicle lane on which the object is located.

Further, in the first to third embodiments, an example has been described in which the speed information of the own vehicle is acquired by the vehicle wheel speed sensor, but the speed information of the own vehicle may be acquired by a unit or a device other than the vehicle wheel speed sensor.

Further, in the above-described second embodiment, an example has been described in which the solid object is detected by the stereo camera including a plurality of cameras, but the solid object may be detected by a monocular camera.

Further, in the third embodiment, an example has been described in which the monocular camera is attached while being directed backward so that the vehicle lane behind the own vehicle is detected. However, a stereo camera including a plurality of cameras may be attached while being directed backward so that the vehicle lane or the solid object behind the own vehicle is detected and the position of the vehicle lane or the position of the solid object behind the own vehicle (particularly, at the rear side of the detection area (the image capturing area) of the stereo camera) may be estimated on the basis of the detection result.

In addition, the invention is not limited to the first to third embodiments and includes various modified examples. For example, the first to third embodiments are merely used to easily describe the invention and may not essentially include all configurations described above. Further, a part of a certain embodiment can be replaced by the configurations of the other embodiments and the configurations of the other embodiments may be added to the configuration of a certain embodiment. Further, a part of the configurations of the embodiments can be added, deleted, or replaced.

Further, only control lines or information lines necessary for description are depicted in the drawings and all control lines or information lines necessary for a product are not depicted in the drawings. In fact, it may be considered that all configurations are connected to one another.

REFERENCE SIGNS LIST 1, 1A, 1B rear object detection device
2, 2B vehicle lane detection device
2A solid object detection device
3, 3A, 3B travel history calculation device
4, 4B vehicle lane position estimation unit
4A solid object position estimation unit
5, 5A, 5B relative position calculation unit
6, 6A, 6B determination unit
7, 7A, 7B radio wave radar (rear object detection unit)
8 front camera (image sensing device)
8A stereo camera (image sensing device)
8B rear camera (image sensing device)
9, 9B vehicle lane detection unit
9A solid object detection unit
10, 10B vehicle lane position information storage unit
10A solid object position information storage unit
11, 11A, 11B travel history calculation unit
20, 20A, 20B object recognition apparatus
21, 21A, 21B steering angle sensor
22, 22A, 22B yaw rate sensor
23, 23A, 23B vehicle wheel speed sensor
24, 24A, 24B navigation system
25, 25A, 25B control unit
GR guardrail
VP preceding vehicle
VS own vehicle
VT target vehicle

The invention claimed is:

1. An object recognition apparatus that recognizes a position of an object existing behind an own vehicle, comprising:
   an image sensing device that captures an image of an environment at the front or rear side of the own vehicle;
   a vehicle lane detection unit that detects a vehicle lane at the front or rear side of the own vehicle on the basis of the image captured by the image sensing device;
   a vehicle lane position estimation unit that estimates a position of a vehicle lane behind the own vehicle on the basis of the vehicle lane detected by the vehicle lane detection unit and a travel history of the own vehicle;
   a rear object detection unit that detects an object existing behind the own vehicle;
   a relative position calculation unit that calculates a relative position of the object detected by the rear object detection unit with respect to the position of the vehicle lane estimated by the vehicle lane position estimation unit;
   a determination unit that determines whether the object exists on a predetermined vehicle lane on the basis of the relative position of the object calculated by the relative position calculation unit, including determining whether the object exists at an inside or an outside of a right road dividing line; and
   a travel history calculation unit that calculates the travel history of the own vehicle based on information obtained from a vehicle speed sensor, a yaw rate sensor, a steering angle sensor, and a navigation system.

2. The object recognition apparatus according to claim 1, wherein the vehicle lane detection unit detects a vehicle lane at the front or rear side of the own vehicle by extracting a road dividing line at the front or rear side of the own vehicle from the image captured by the image sensing device.

3. The object recognition apparatus according to claim 1, wherein the image sensing device is configured as a monocular camera.

4. The object recognition apparatus according to claim 1, wherein the rear object detection unit is configured as a radio wave radar.

5. A vehicle travel controller that controls a travel state of an own vehicle based on a position of an object, comprising:
   a control unit that generates control signals for controlling the travel state of the own vehicle; and
   an object recognition apparatus that recognizes the position of the object existing behind the own vehicle, the object recognition apparatus including
      an image sensing device that captures an image of an environment at the front or rear side of the own vehicle;
      a vehicle lane detection unit that detects a vehicle lane at the front or rear side of the own vehicle on the basis of the image captured by the image sensing device;
      a vehicle lane position estimation unit that estimates a position of a vehicle lane behind the own vehicle on the basis of the vehicle lane detected by the vehicle lane detection unit and a travel history of the own vehicle;
      a rear object detection unit that detects an object existing behind the own vehicle;
      a relative position calculation unit that calculates a relative position of the object detected by the rear object detection unit with respect to the position of the vehicle lane estimated by the vehicle lane position estimation unit;

a determination unit that determines whether the object exists on a predetermined vehicle lane on the basis of the relative position of the object calculated by the relative position calculation unit, including determining whether the object exists at an inside or an outside of a right road dividing line; and a travel history calculation unit that calculates the travel history of the own vehicle based on information obtained from a vehicle speed sensor, a yaw rate sensor, a steering angle sensor, and a navigation system.

6. The vehicle travel controller according to claim 5, wherein a warning is generated when the determination unit determines that the object exists on a predetermined vehicle lane.

7. An object recognition apparatus that recognizes a position of an object existing behind an own vehicle, comprising:

an image sensing device that captures an image of an environment at the front or rear side of the own vehicle;

a solid object detection unit that detects a stationary object at the front or rear side of the own vehicle on the basis of the image captured by the image sensing device;

a solid object position estimation unit that estimates a position of the stationary object behind the own vehicle based on the stationary object detected by the solid object detection unit and a travel history of the own vehicle;

a rear object detection unit that detects an object existing behind the own vehicle;

a relative position calculation unit that calculates a relative position of the object detected by the rear object detection unit with respect to the position of the stationary object estimated by the solid object position estimation unit;

a determination unit that determines whether the object exists in a predetermined area based on the relative position of the object calculated by the relative position calculation unit, including determining whether the object exists at an inside or an outside of a right road dividing line; and a travel history calculation unit that calculates the travel history of the own vehicle based on information obtained from a vehicle speed sensor, a yaw rate sensor, a steering angle sensor, and a navigation system.

8. The object recognition apparatus according to claim 7, wherein the image sensing device includes a plurality of cameras.

9. The object recognition apparatus according to claim 7, wherein the rear object detection unit is configured as a radio wave radar.

10. A vehicle travel controller that controls a travel state of an own vehicle based on a position of an object, comprising:

a control unit that generates control signals for controlling the travel state of the own vehicle; and an object recognition apparatus that recognizes the position of the object existing behind the own vehicle, the object recognition apparatus including an image sensing device that captures an image of an environment at the front or rear side of the own vehicle;

a solid object detection unit that detects a stationary object at the front or rear side of the own vehicle on the basis of the image captured by the image sensing device:

a solid object position estimation unit that estimates a position of the stationary object behind the own vehicle based on the stationary object detected by the solid object detection unit and a travel history of the own vehicle;

a rear object detection unit that detects an object existing behind the own vehicle;

a relative position calculation unit that calculates a relative position of the object detected by the rear object detection unit with respect to the position of the stationary object estimated by the solid object position estimation unit;

a determination unit that determines whether the object exists in a predetermined area based on the relative position of the object calculated by the relative position calculation unit, including determining whether the object exists at an inside or an outside of a right road dividing line; and a travel history calculation unit that calculates the travel history of the own vehicle based on information obtained from a vehicle speed sensor, a yaw rate sensor, a steering angle sensor, and a navigation system.

11. The vehicle travel controller according to claim 10, wherein a warning is generated when the determination unit determines that the object exists in a predetermined area.

\* \* \* \* \*